(12) United States Patent
Westerink et al.

(10) Patent No.: US 8,733,840 B2
(45) Date of Patent: May 27, 2014

(54) SEAT PAN ASSEMBLY

(75) Inventors: Rik Westerink, Corinth, TX (US);
Armando Valdes, Krum, TX (US);
Chirag Patel, Dallas, TX (US); Timothy W. Terleski, Richardson, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 13/542,816

(22) Filed: Jul. 6, 2012

(65) Prior Publication Data
US 2013/0009435 A1    Jan. 10, 2013

Related U.S. Application Data

(60) Provisional application No. 61/504,726, filed on Jul. 6, 2011, provisional application No. 61/630,916, filed on Dec. 21, 2011.

(51) Int. Cl.
*B60N 2/12* (2006.01)
*B60N 2/20* (2006.01)
*B60N 2/22* (2006.01)

(52) U.S. Cl.
USPC ........... 297/322; 297/316; 297/317; 297/340; 297/341; 297/342

(58) Field of Classification Search
USPC ......... 297/118, 316, 317, 318, 322, 340, 341, 297/342, 343
See application file for complete search history.

(56) References Cited

U.S. PATENT DOCUMENTS

| 3,005,660 | A | | 10/1961 | Winick |
| 4,362,336 | A | | 12/1982 | Zapf et al. |
| 4,767,157 | A | * | 8/1988 | Kazaoka et al. ............... 297/322 |
| 5,112,109 | A | | 5/1992 | Takada et al. |
| 5,203,532 | A | | 4/1993 | Matsuura |
| 5,558,399 | A | | 9/1996 | Serber |
| 5,722,726 | A | | 3/1998 | Matsumiya |

(Continued)

FOREIGN PATENT DOCUMENTS

| EP | 1116653 | 7/2001 |
| EP | 1234763 | 8/2002 |

(Continued)

OTHER PUBLICATIONS

International Search Report and Written Opinion dated May 31, 2011 in related Application No. PCT/US2011/024407.

(Continued)

*Primary Examiner* — Rodney B White
(74) *Attorney, Agent, or Firm* — Kilpatrick Townsend & Stockton LLP; Tiffany L. Williams, Esq.; Dean W. Russell, Esq.

(57) ABSTRACT

Described are seat pan assemblies for a passenger seat having a pan frame pivotally coupled to a seat back, a seat pan pivotally coupled to the pan frame, a tilting mechanism coupled to the seat pan and the pan frame, wherein the tilting mechanism is configured to rotate the seat pan between an upright position and a sleeper position, and an automatic release mechanism, wherein the automatic release mechanism is configured to return the seat pan to an upright position when the seat back is in an upright position.

17 Claims, 31 Drawing Sheets

(56) References Cited

U.S. PATENT DOCUMENTS

| | | | |
|---|---|---|---|
| 5,735,574 A | 4/1998 | Serber | |
| 5,857,745 A | 1/1999 | Matsumiya | |
| 6,030,043 A * | 2/2000 | Habedank | 297/342 |
| 6,237,994 B1 | 5/2001 | Bentley et al. | |
| 6,340,208 B1 * | 1/2002 | Habedank | 297/322 |
| 6,481,798 B2 * | 11/2002 | Romca et al. | 297/340 X |
| 6,641,214 B2 | 11/2003 | Veneruso | |
| 6,679,556 B1 | 1/2004 | Alvestad | |
| 6,688,691 B2 | 2/2004 | Marechal et al. | |
| 6,692,069 B2 | 2/2004 | Beroth et al. | |
| 6,877,597 B2 | 4/2005 | Bach et al. | |
| 7,229,118 B2 | 6/2007 | Saberan et al. | |
| 7,374,245 B2 | 5/2008 | Tanaka et al. | |
| 7,469,861 B2 | 12/2008 | Ferry et al. | |
| 7,472,957 B2 | 1/2009 | Ferry et al. | |
| 7,523,888 B2 | 4/2009 | Ferry et al. | |
| 7,637,571 B2 | 12/2009 | Okano et al. | |
| 7,997,654 B2 | 8/2011 | Ferry et al. | |
| 8,439,435 B2 * | 5/2013 | Gaither et al. | 297/316 X |
| 2001/0000639 A1 | 5/2001 | Park et al. | |
| 2002/0063449 A1 | 5/2002 | Plant | |
| 2005/0046259 A1 | 3/2005 | Schuerg | |
| 2007/0235271 A1 | 10/2007 | Elliot et al. | |
| 2008/0211283 A1 | 9/2008 | Okano et al. | |
| 2010/0019086 A1 | 1/2010 | Ferry et al. | |
| 2010/0253122 A1 | 10/2010 | Okimoto et al. | |
| 2010/0308167 A1 | 12/2010 | Hawkins et al. | |
| 2011/0193386 A1 | 8/2011 | Gaither et al. | |
| 2012/0217779 A1 | 8/2012 | Gaither et al. | |

FOREIGN PATENT DOCUMENTS

| | | |
|---|---|---|
| EP | 1970245 | 9/2008 |
| GB | 1049792 | 11/1966 |
| GB | 1271869 | 4/1972 |
| WO | WO03013903 | 2/2003 |
| WO | WO2011100476 | 8/2011 |

OTHER PUBLICATIONS

International Preliminary Report on Patentability dated Aug. 23, 2012 in related Application No. PCT/US2011/024407.
International Search Report and Written Opinion dated Sep. 7, 2012 in related Application No. PCT/US2012/030792.
Office Action dated Oct. 24, 2012 in U.S. Appl. No. 13/025,086.
International Search Report and Written Opinion dated Dec. 3, 2012 in Application No. PCT/US2012/045658.
International Preliminary Report on Patentability dated Oct. 10, 2013 in Application No. PCT/US2012/030792.
U.S. Appl. No. 13/432,109 , "Non-Final Office Action", Jan. 17, 2014, 13 pages.
PCT/US2012/045058 , "International Preliminary Report on Patentability", Jan. 16, 2014, 8 pages.

\* cited by examiner

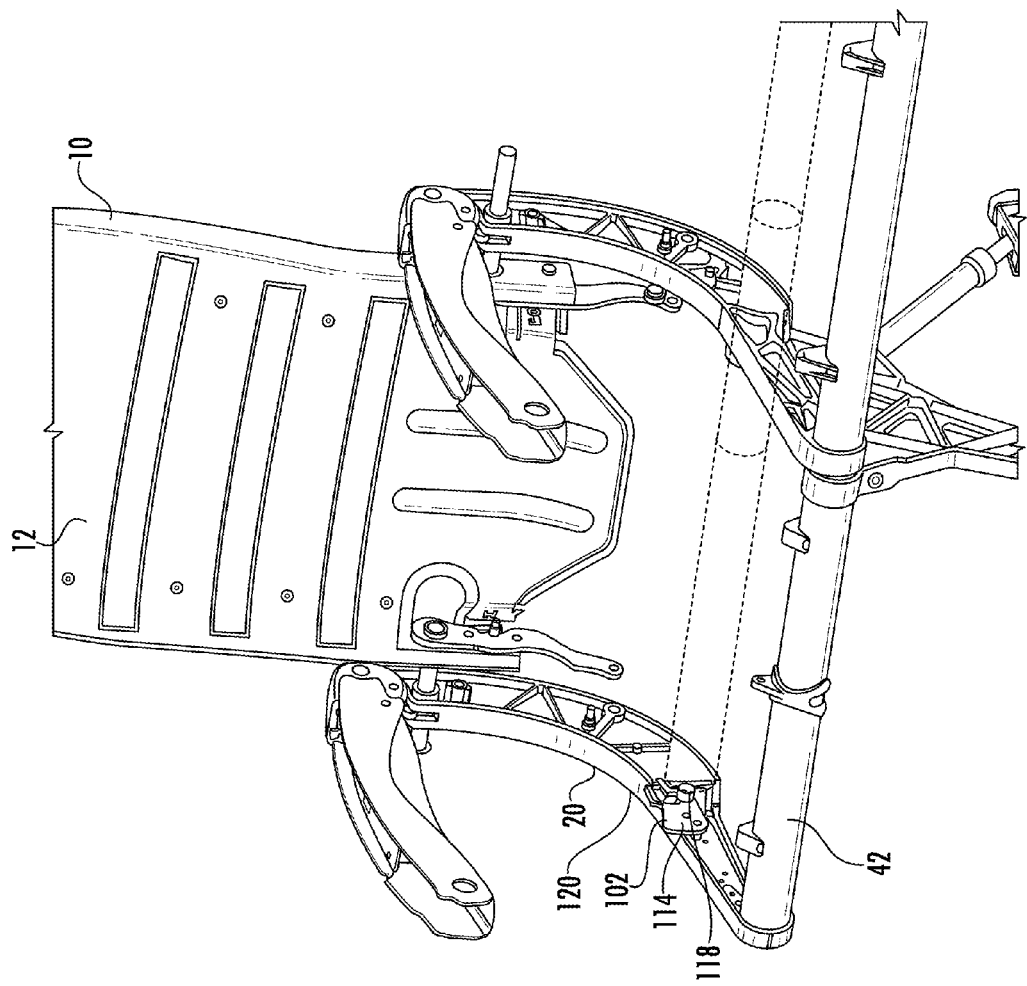

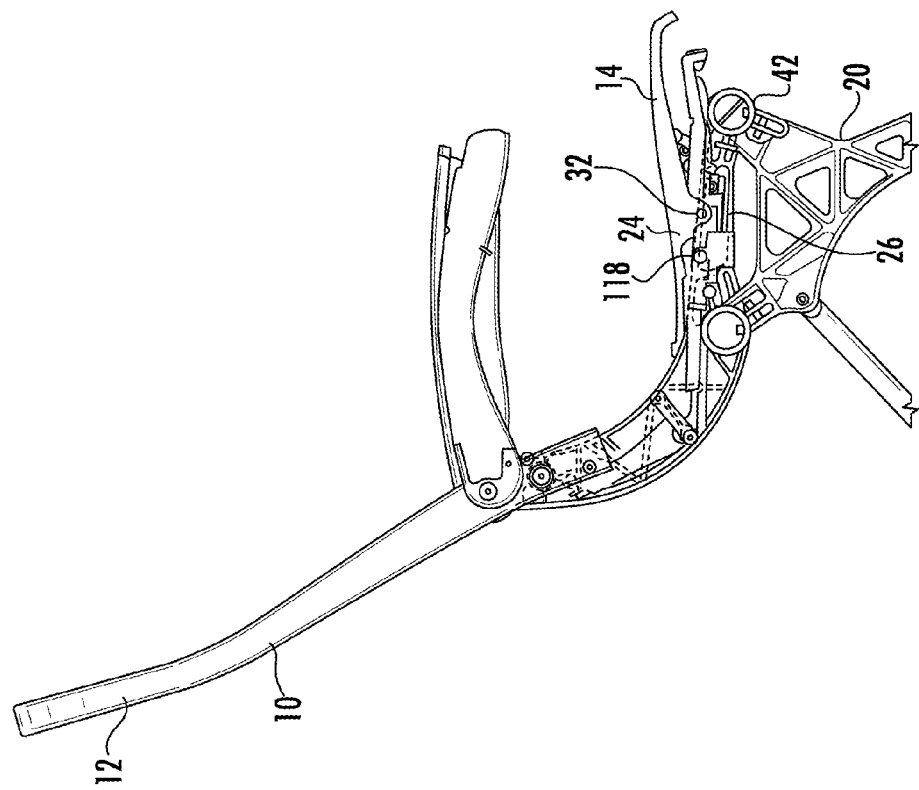
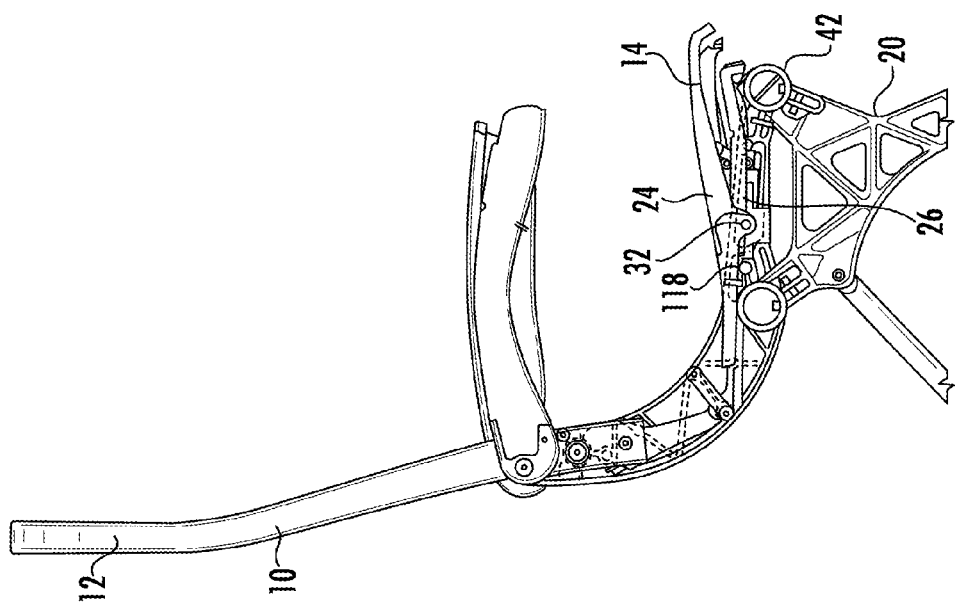

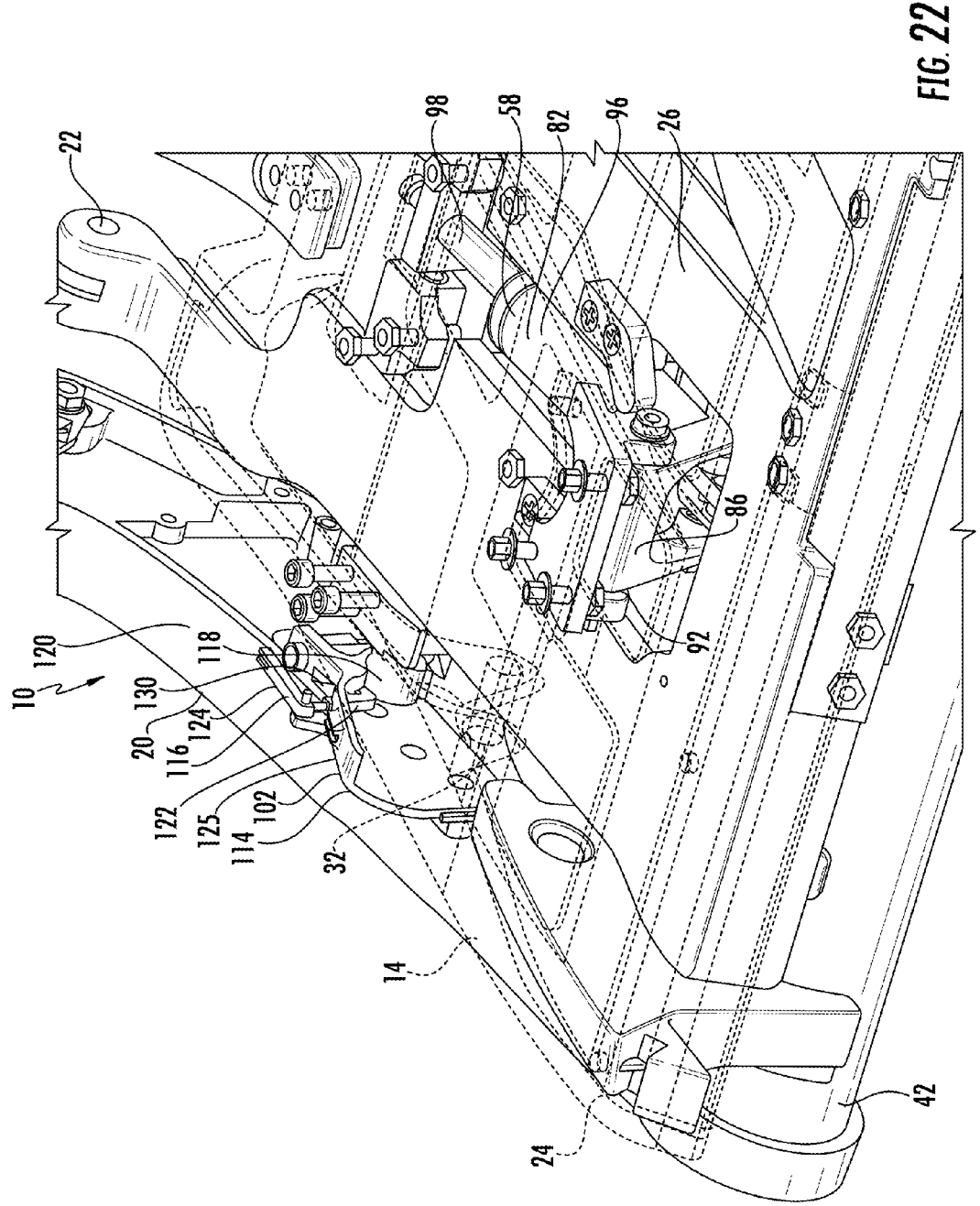

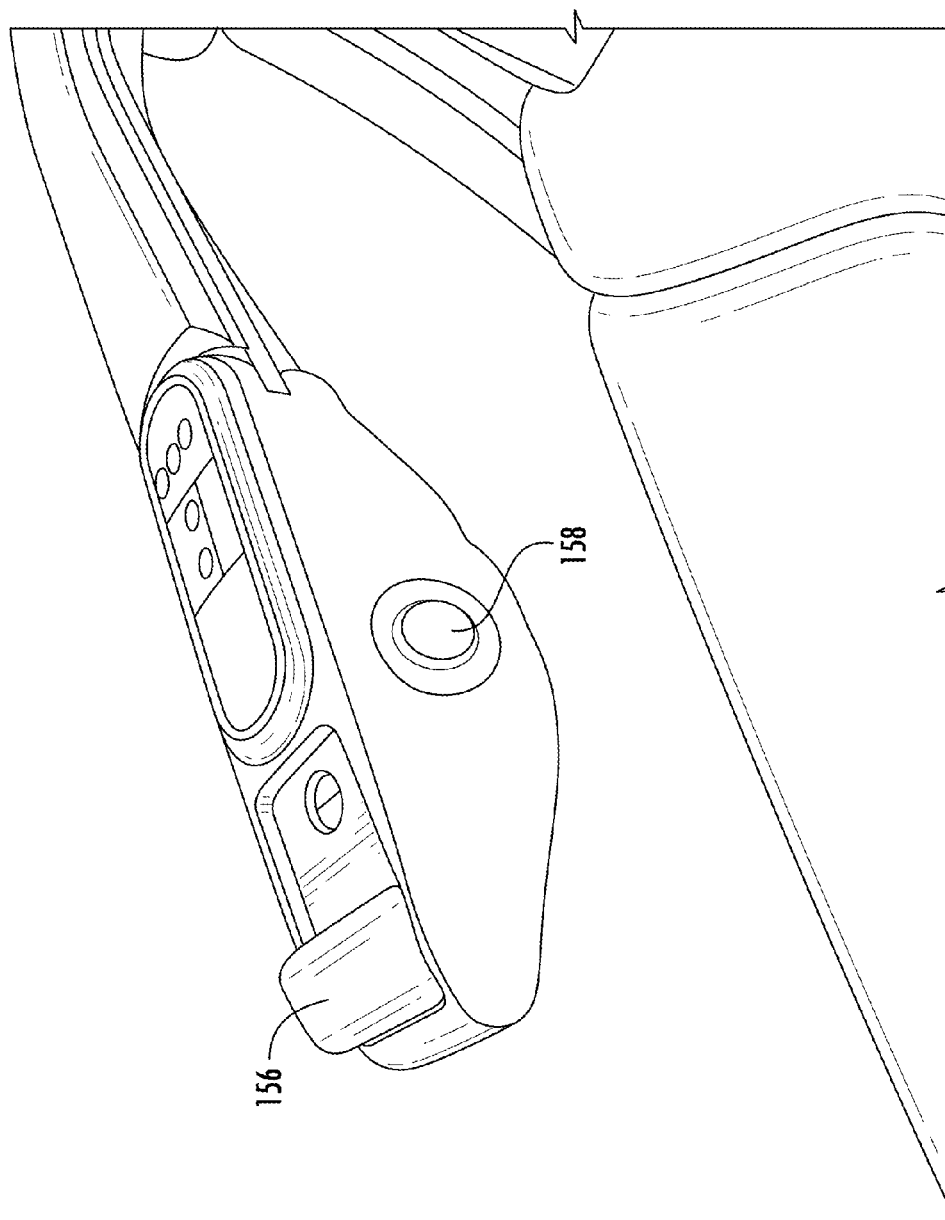

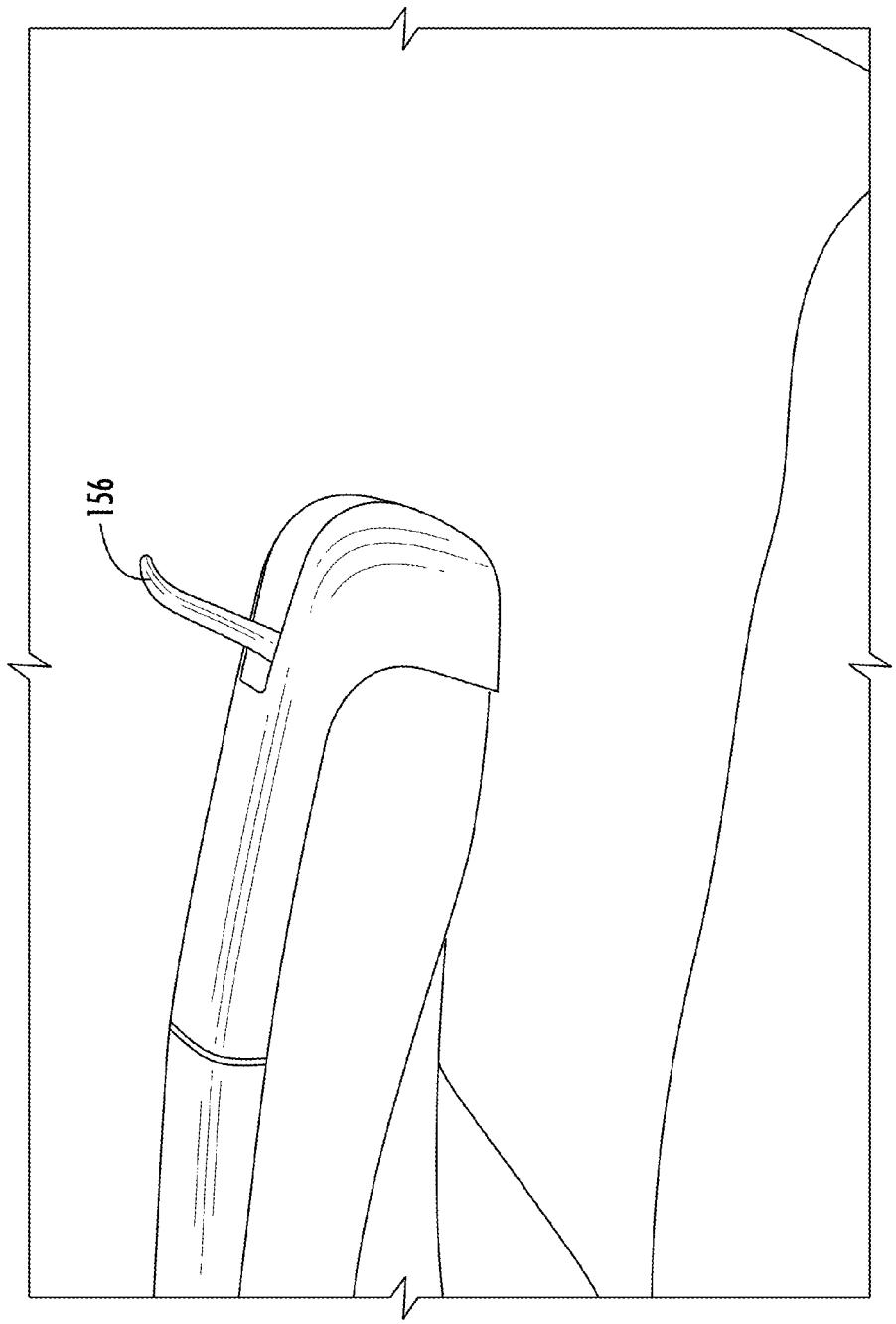

SEAT PAN ASSEMBLY

CROSS REFERENCE TO RELATED APPLICATIONS

This application is related to and claims priority benefits from U.S. Provisional Application Ser. No. 61/504,726, filed on Jul. 6, 2011, entitled PASSENGER SEAT (2MOTION UPDATE) ("the '726 application") and U.S. Provisional Application Ser. No. 61/630,916, filed on Dec. 21, 2011, entitled TILTING SEAT PAN RELEASE MECHANISM ("the '916 application"). The '726 and '916 applications are hereby incorporated in their entireties by this reference.

FIELD OF THE INVENTION

The field of the invention relates to passenger seats or the like.

BACKGROUND

Common carriers, such as passenger airlines, bus lines, and train lines, frequently convey substantial numbers of passengers simultaneously. In many instances, there is a desire to increase the number of seats within a given space to optimize the number of passengers being transported at any given time. By increasing the number of passenger seats in the space, the amount of space available for each passenger is diminished.

In order to provide as much room as possible for the passenger in the diminished space, some passenger seats have been modified to reduce the distance that the passenger seat back may be reclined. In some cases, to offset the reduction in passenger comfort created by the limited recline, the passenger seat bottom pan may tilt forward to increase the recline angle of the entire seat while maintaining the limited amount of intrusion of the passenger seat back into the next-aft passenger seat space. While these modifications have improved the reclining comfort, additional improvements are desired to provide a comfortable sleeping position without increasing the amount of intrusion of the passenger seat back into the next-aft passenger seat space.

SUMMARY

Embodiments of the present invention include a seat pan assembly for a passenger seat comprising a pan frame pivotally coupled to a seat back, a seat pan pivotally coupled to the pan frame, a tilting mechanism coupled to the seat pan and the pan frame, wherein the tilting mechanism is configured to rotate the seat pan between an upright position and a sleeper position, and an automatic release mechanism, wherein the automatic release mechanism is configured to return the seat pan to an upright position when the seat back is in an upright position.

In certain embodiments, the automatic release mechanism may further comprise a ramp and a lever mechanism, wherein the ramp may be configured to be positioned proximate a forward base frame tube without at least a forward portion of the ramp contacting the forward base frame tube until the seat back approaches the upright position. The automatic release mechanism may also further comprise a track and a lever mechanism, wherein the track may be configured to be positioned proximate a cam follower attached to the seat pan without at least an aft portion of the track contacting the cam follower until the seat back approaches the upright position. A passenger seat may comprise the seat pan assembly and a lumbar mechanism coupled to the seat back.

In some embodiments, the tilting mechanism may comprise a clutch assembly coupled to the pan frame, wherein the clutch assembly comprises a fixed component and a variable component, wherein the variable component is coupled to the seat pan. The clutch assembly may also be configured to allow the seat pan to pivot relative to the pan frame when a pulling force is applied to the variable component, and to lock the seat pan into position relative to the pan frame when the variable component is engaged with the fixed component.

In some embodiments, the tilting mechanism may comprise a gas lock comprising a piston and a cylinder, wherein the piston is coupled to the seat pan and the cylinder is coupled to the panframe.

BRIEF DESCRIPTION OF THE DRAWINGS

FIG. 19 is a perspective view of a passenger seat with the automatic release mechanism of FIG. 18.

FIG. 20 is a side view of the passenger seat of FIG. 19 in an upright position.

FIG. 21 is a side view of the passenger seat of FIG. 19 in a reclined position.

FIG. 22 is a partial perspective view of the passenger seat of FIG. 19 showing a cam follower in a recess of the automatic release mechanism when the passenger seat is in an upright position.

FIG. 40 is a perspective view of yet other embodiments of a control panel for the passenger seat of FIG. 1.

FIG. 41 is a perspective view of yet other embodiments of a control panel for the passenger seat of FIG. 1.

DETAILED DESCRIPTION

Figure 1:
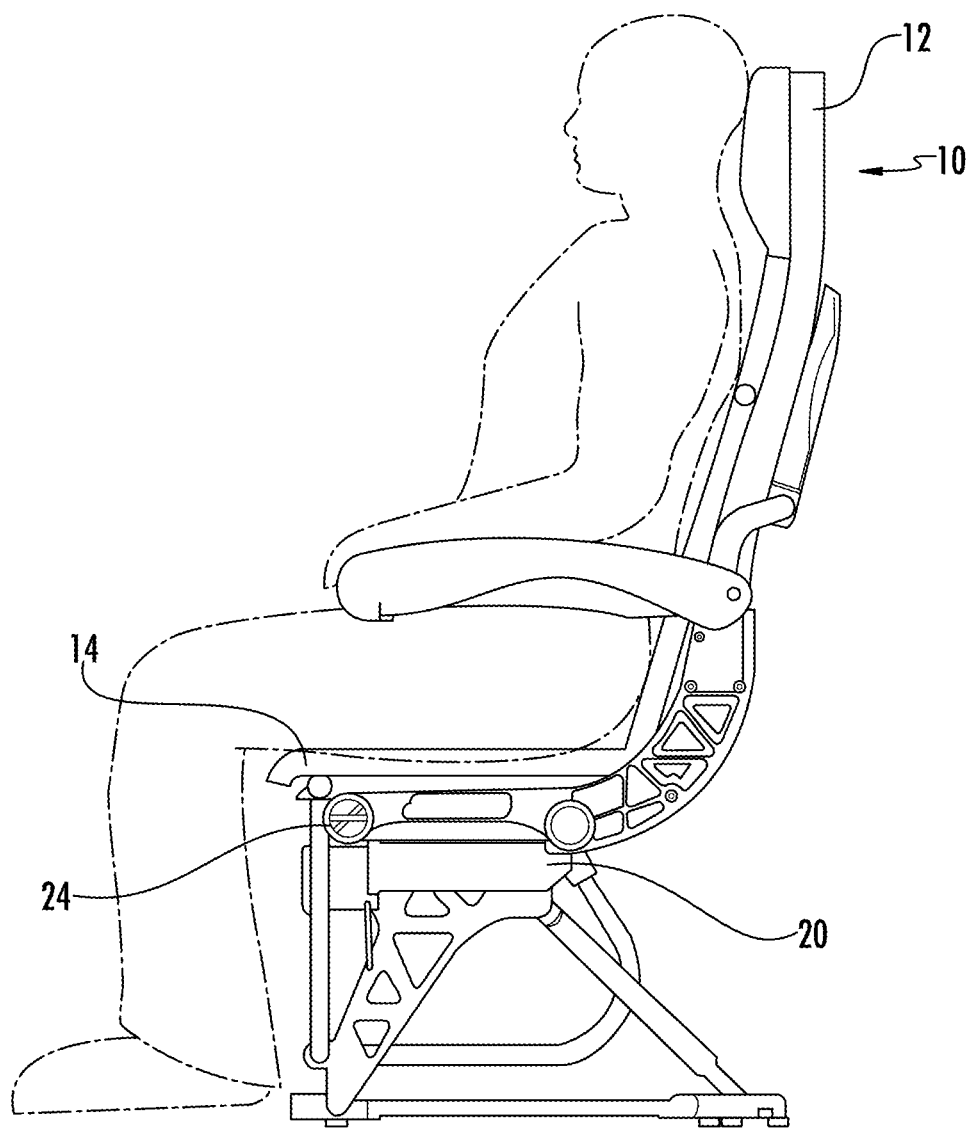
FIG. 1 is a general side view of a passenger seat according to certain embodiments of the present invention in an upright position.
Figure 2:
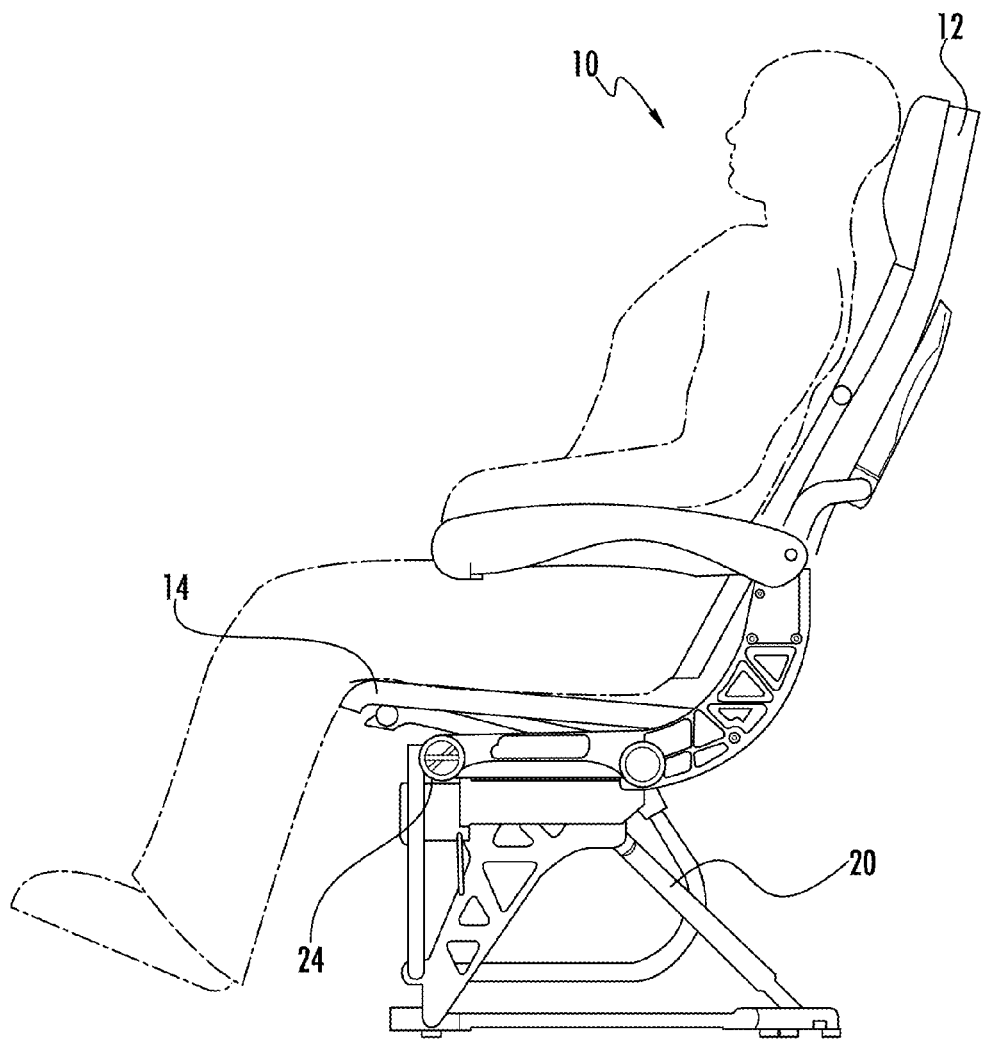
FIG. 2 is a general side view of the passenger seat of FIG. 1 in a reclining position.

Embodiments of the invention provide passenger seats with reclining and sleeper positions. While the passenger seats are discussed for use with aircraft, they are by no means so limited. Rather, embodiments of the passenger seats may be used with any type of vehicle or otherwise as desired.

FIGS. 1-41 illustrate embodiments of a passenger seat 10. In some embodiments, the passenger seat 10 comprises a seat back 12, a seat pan assembly 14, and a lumbar mechanism 18.

The seat back 12 may be formed of materials including but not limited to aluminum, stainless steel, other metallic materials, composite materials, or other similar materials. Each side of the seat back 12 may be pivotally coupled to the seat pan assembly 14 via a pivot shaft 22.

In the embodiments shown in FIGS. 1-41, the seat pan assembly 14 comprises a seat pan 24 coupled to a pan frame 26. The seat pan assembly 14 may be formed of materials including but not limited to aluminum, stainless steel, other metallic materials, composite materials, or other similar materials. Further, the seat pan 24 and the pan frame 26 may be formed of the same or different materials.

Figure 5:
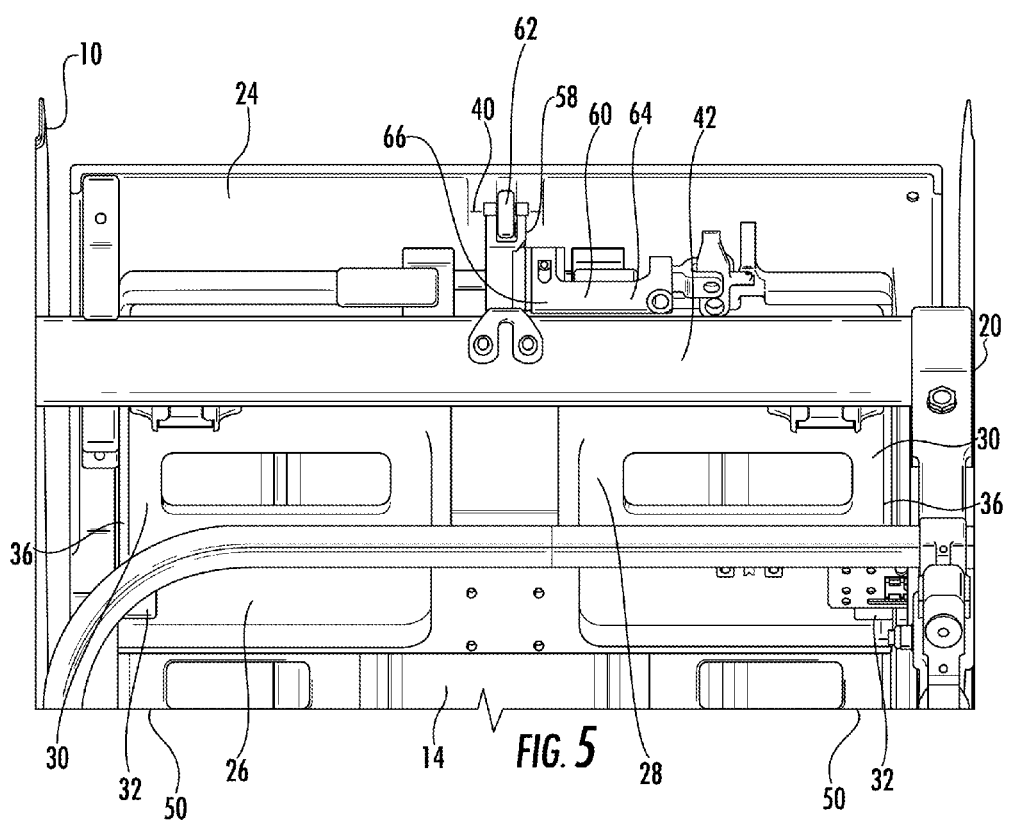
FIG. 5 is a bottom view of the seat pan assembly of FIG. 4.
Figure 6:
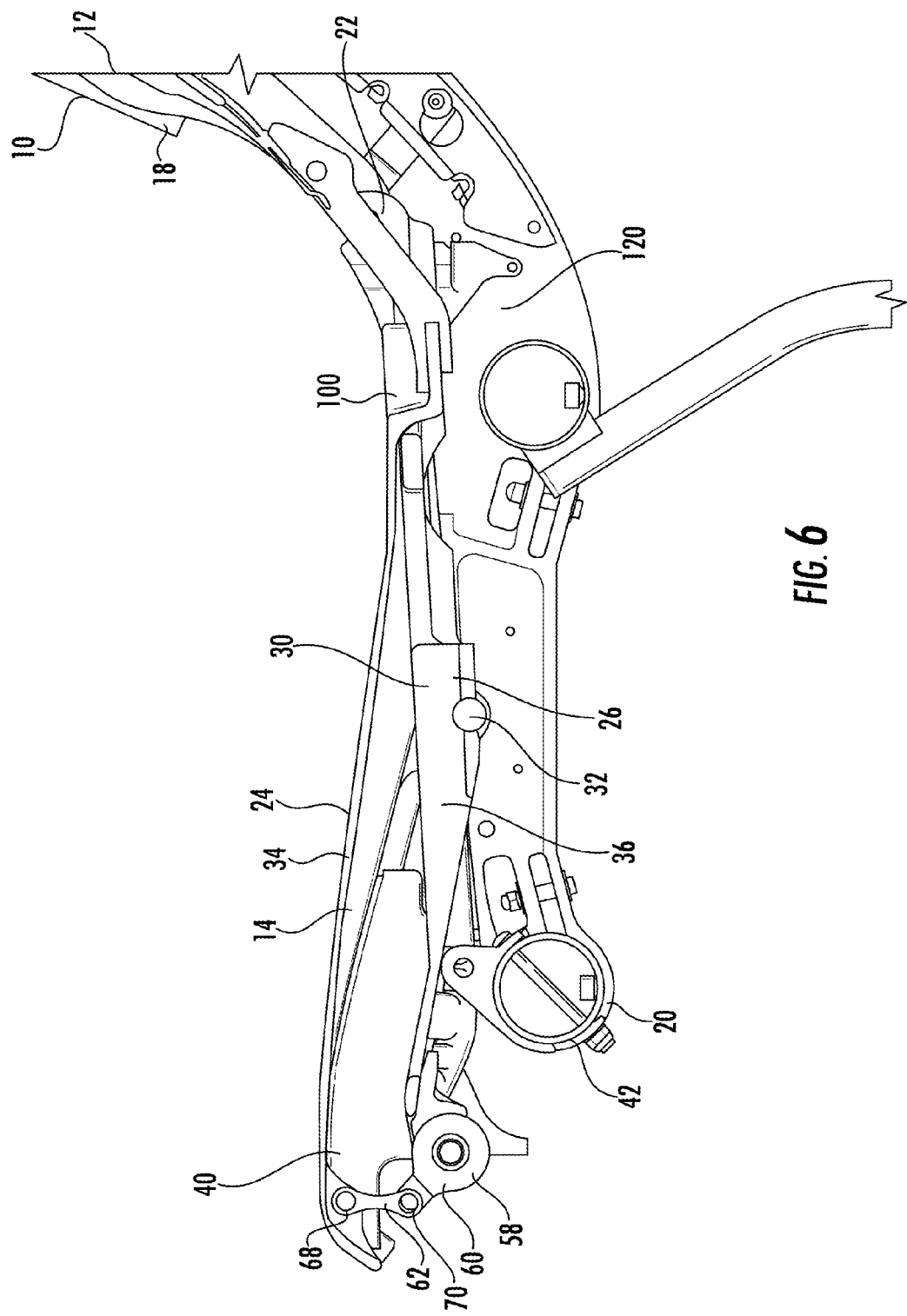
FIG. 6 is a side view of the seat pan assembly of FIG. 4 in a reclined position.
Figure 7:
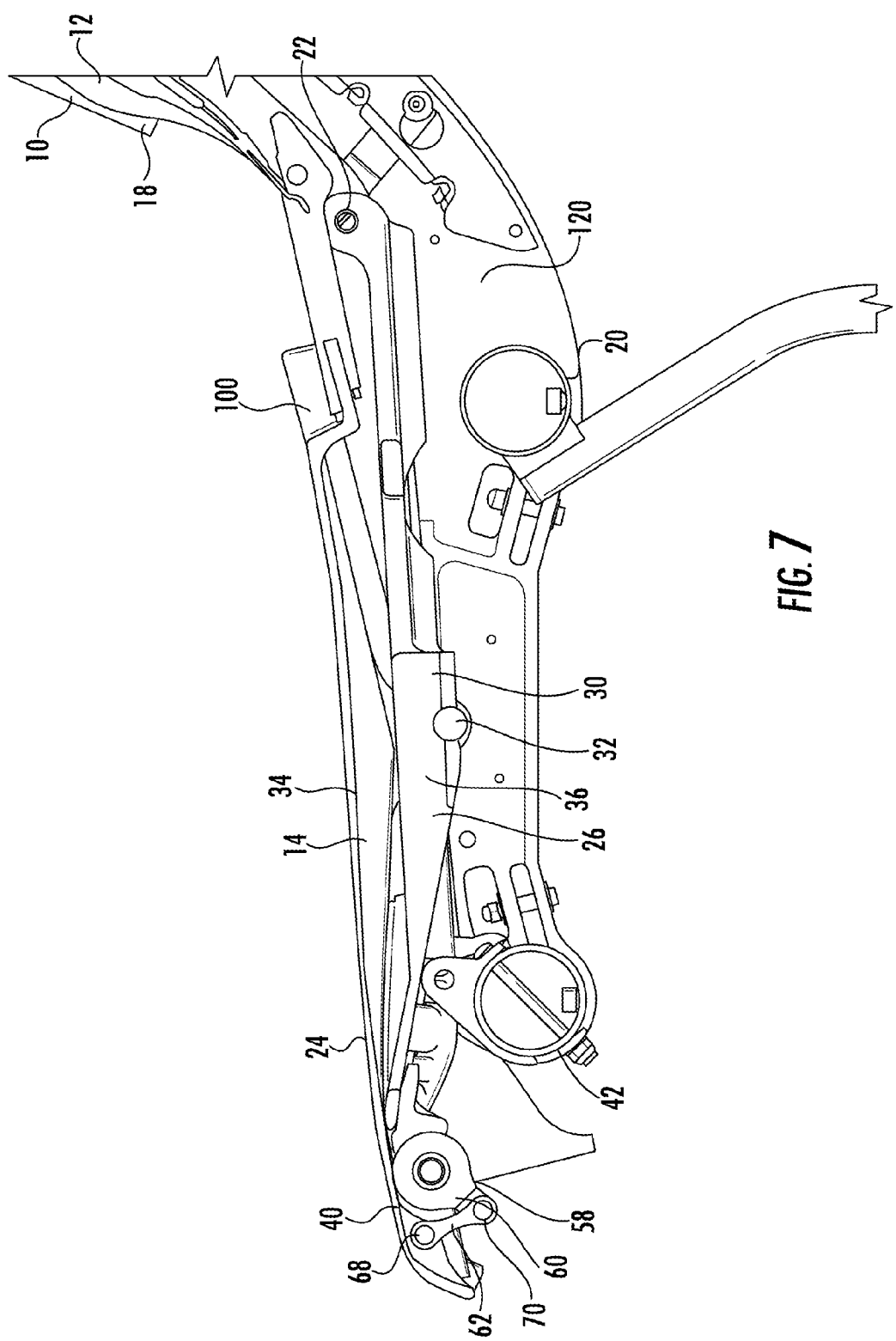
FIG. 7 is a side view of the seat pan assembly of FIG. 4 in a sleeper position.
Figure 10:
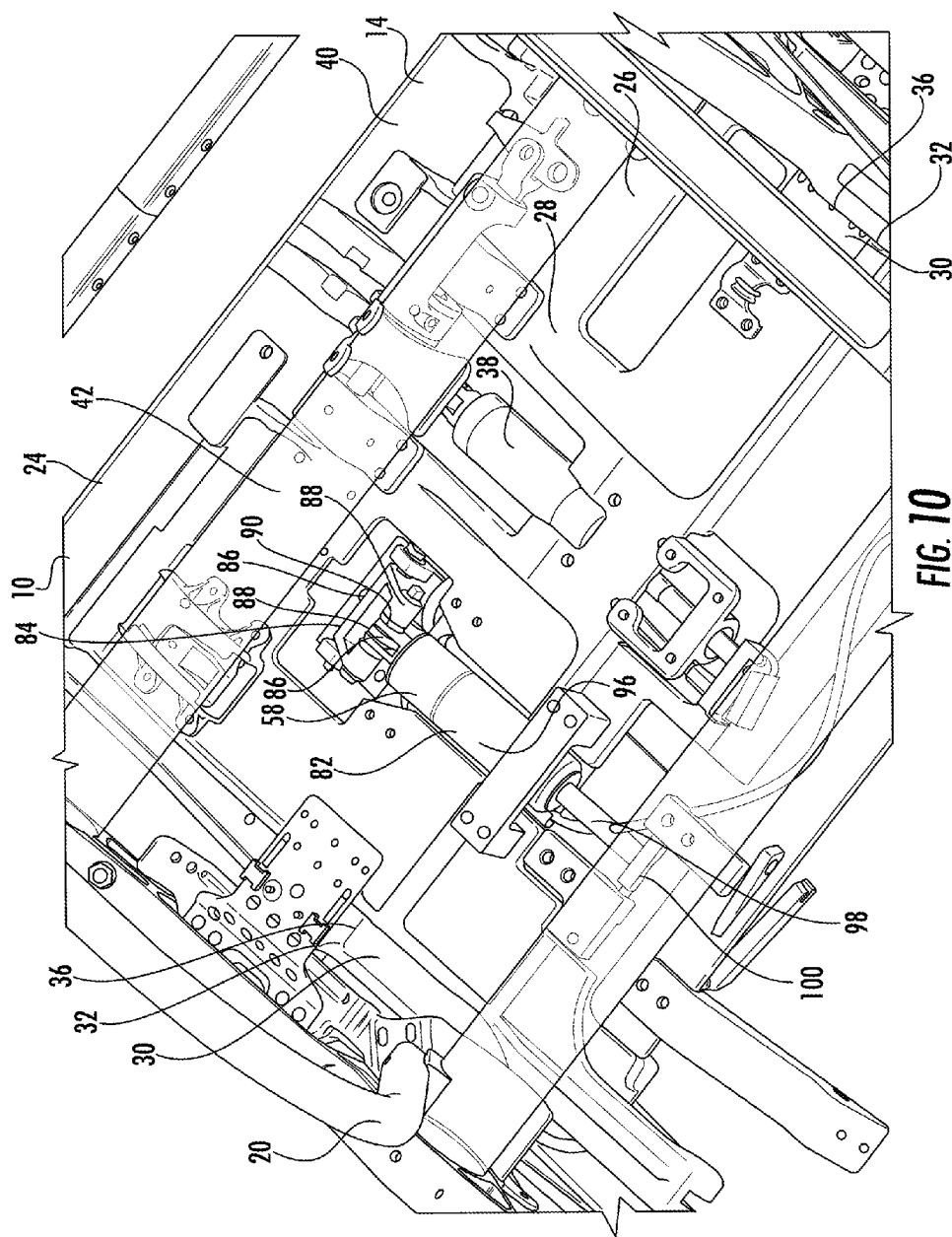
FIG. 10 is a bottom view of a seat pan assembly according to certain embodiments of the present invention.
Figure 11:
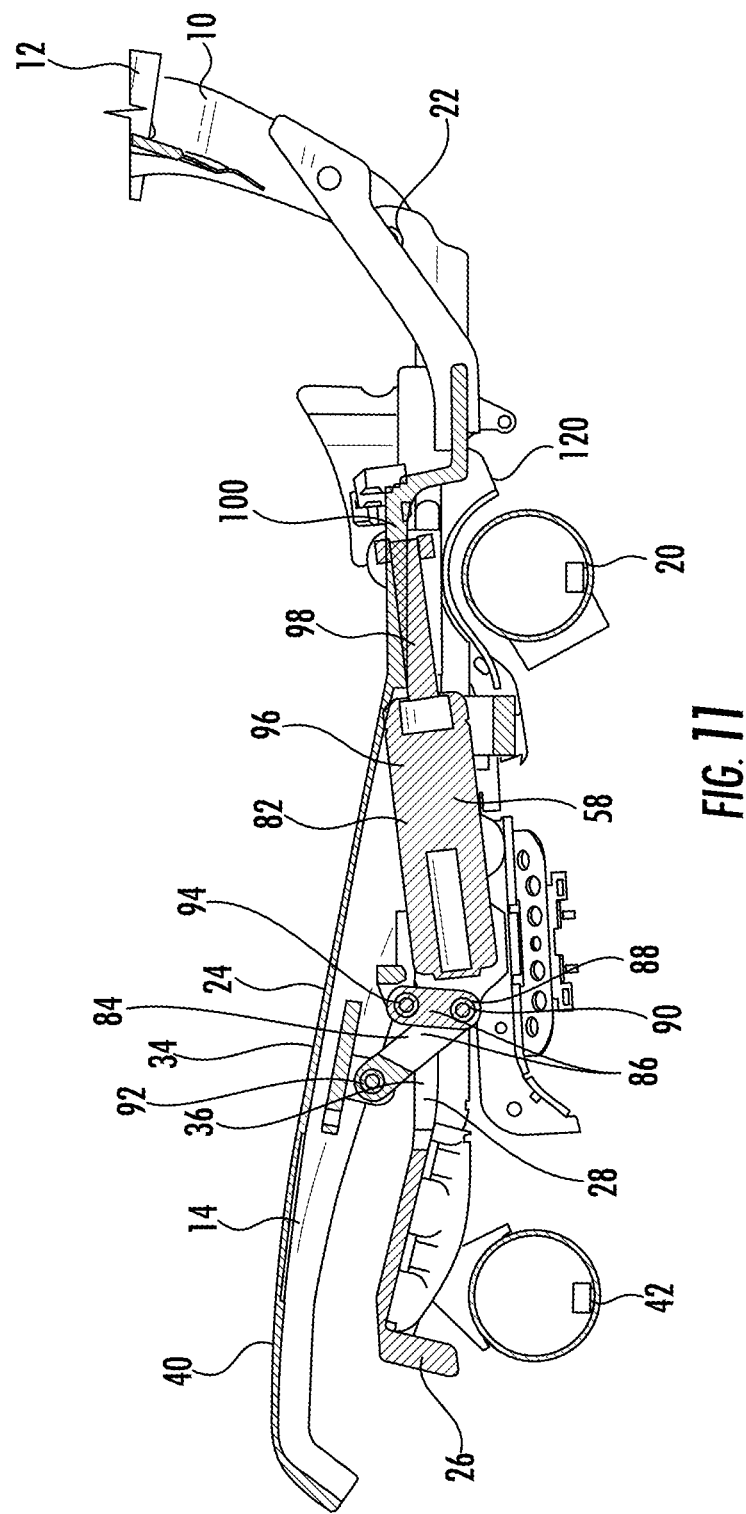
FIG. 11 is a side view of the seat pan assembly of FIG. 10 in an upright position.
Figure 12:
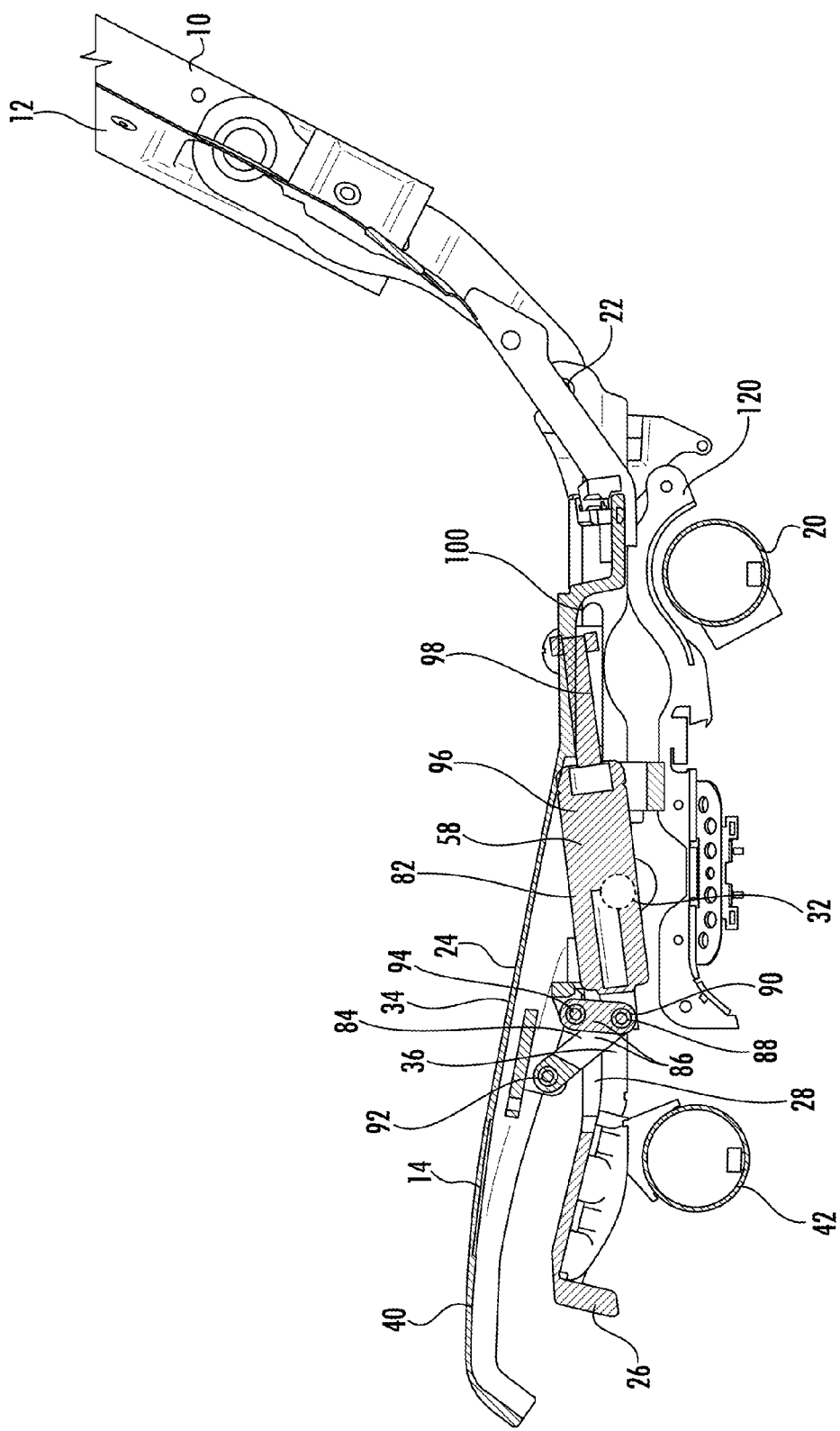
FIG. 12 is a side view of the seat pan assembly of FIG. 10 in a reclined position and showing the seat pan pivot location.
Figure 13:
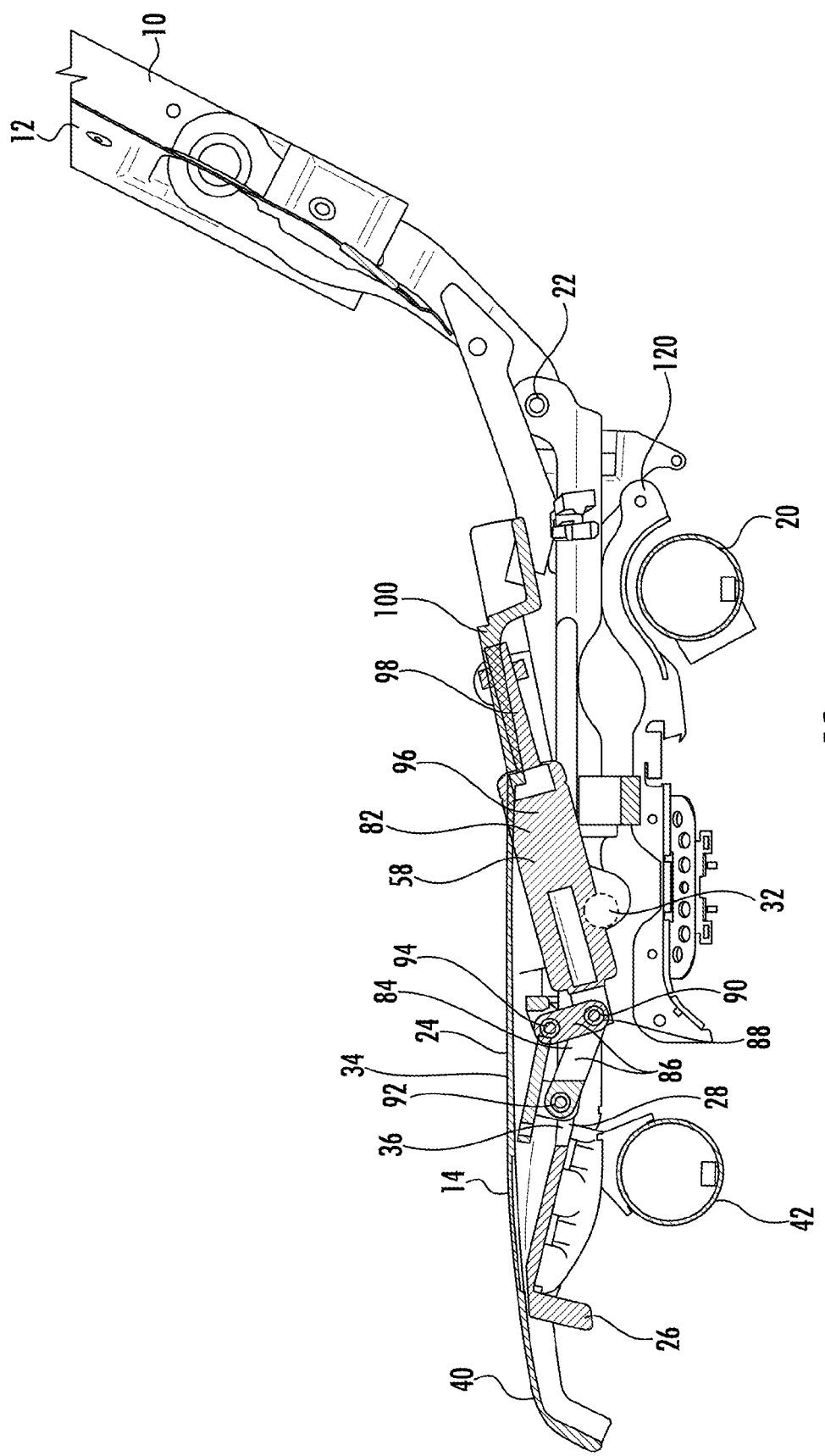
FIG. 13 is a side view of the seat pan assembly of FIG. 10 in a sleeper position and showing the seat pan pivot location.
Figure 16:
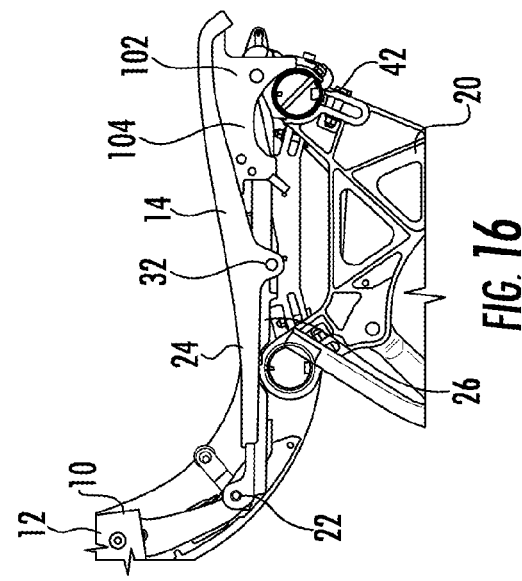
FIG. 16 is a side view of the seat pan assembly of FIG. 14 with the forward portion of the ramp contacting the forward base frame tube in an upright position.
Figure 15:
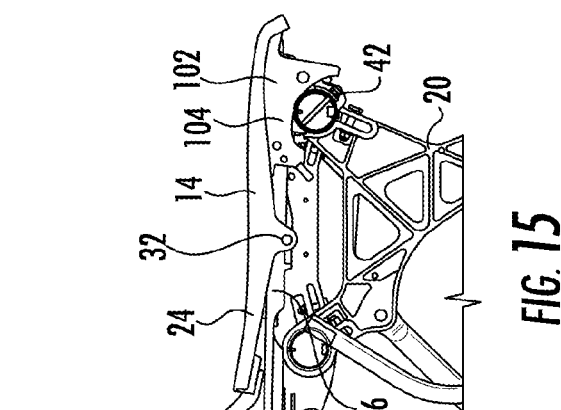
FIG. 15 is a side view of the seat pan assembly of FIG. 14 with the forward portion of the ramp contacting the forward base frame tube in transition to an upright position.
Figure 14:
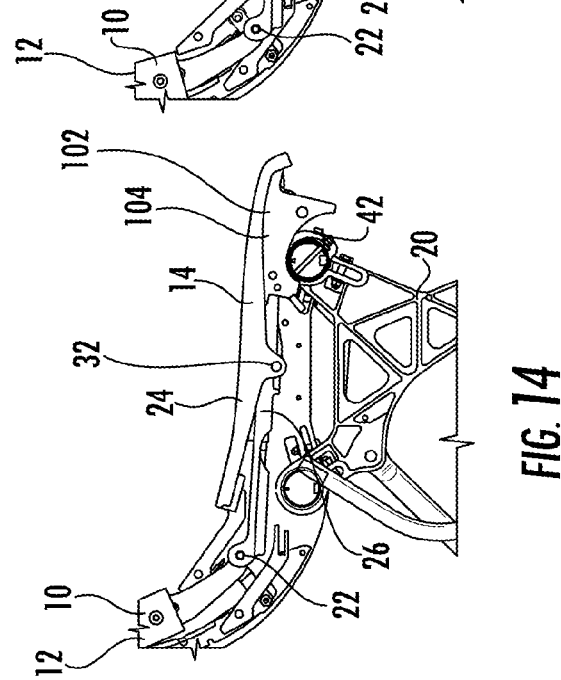
FIG. 14 is a side view of the seat pan assembly of FIG. 4 with an automatic release mechanism according to certain embodiments of the present invention in a sleeper position with a ramp surrounding a forward base frame tube.

In the embodiments shown in FIGS. 5 and 10, the pan frame 26 may comprise a support structure 28 and two side bars 30. In these embodiments, the support structure 28 and the two side bars 30 may be integrally formed and may serve as the primary structure of the pan frame 26.

As shown in FIGS. 4-7, 10, and 12-13, the seat pan 24 may be pivotally coupled to the pan frame 26 adjacent a pair of seat pan pivot locations 32. Each pivot location 32 is located adjacent a forward end 34 of the seat pan 24 and couples to forward ends 36 of the two side bars 30.

As shown in FIG. 10, the seat pan assembly 14 may also include at least one reclining mechanism 38 that may be positioned adjacent a forward end 40 of the seat pan assembly 14 and may be positioned adjacent a forward base frame tube 42 of a seat frame 20. For example, the reclining mechanism 38 may comprise a gas spring or other suitable releasably locking device.

In some embodiments, the lumbar mechanism 18 is coupled to the seat back 12 and the seat pan 24. The lumbar mechanism 18 is described in detail in U.S. Ser. No. 13/432,109, filed on Mar. 28, 2012, entitled PASSENGER SEAT ("the '109 application"). The '109 application is hereby incorporated in its entirety by this reference.

The rotation of the seat pan 24 is controlled via a tilting mechanism 58. In these embodiments, as shown in FIGS. 4-9, the tilting mechanism 58 may comprise a clutch assembly 60 and a link 62. The clutch assembly 60 may further comprise a fixed component 64 and a variable component 66.

A first end 68 of the link 62 may be coupled to the forward end 34 of the seat pan 24, and a second end 70 of the link 62 may be coupled to the variable component 66. The fixed component 64 and the variable component 66 may be coupled to the support structure 28 of the pan frame 26. As a result, rotation of the variable component 66 adjusts the height of the first end 68 of the link and thus the height of the forward end 34 of the seat pan 24. In these embodiments, the fixed component 64 and the variable component 66 may be coupled to one another via a plurality of interlocking teeth 72.

The interlocking teeth 72 may be arranged on a planar surface 74 of a mounting plate 76 within each of the fixed component 64 and the variable component 66. The variable component 66 may include a spring 78 that provides a coupling force that engages the interlocking teeth 72 of the variable component 66 with the interlocking teeth 72 of the fixed component 64. When the interlocking teeth 72 are engaged, the seat pan 24 is prevented from rotating relative to the fixed component 64.

Figure 8:
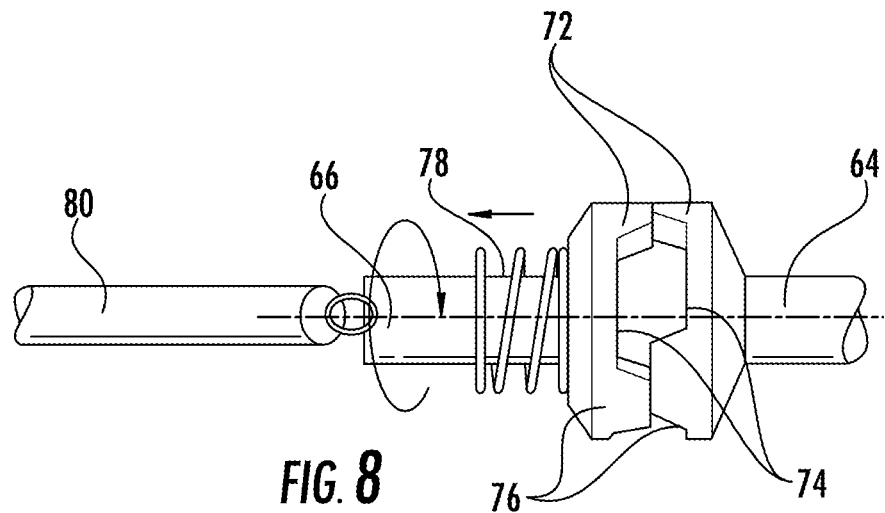
FIG. 8 is a side view of internal components of certain embodiments of a tilting mechanism of the seat pan assembly of FIG. 4, with a variable component disengaged from a fixed component.
Figure 9:
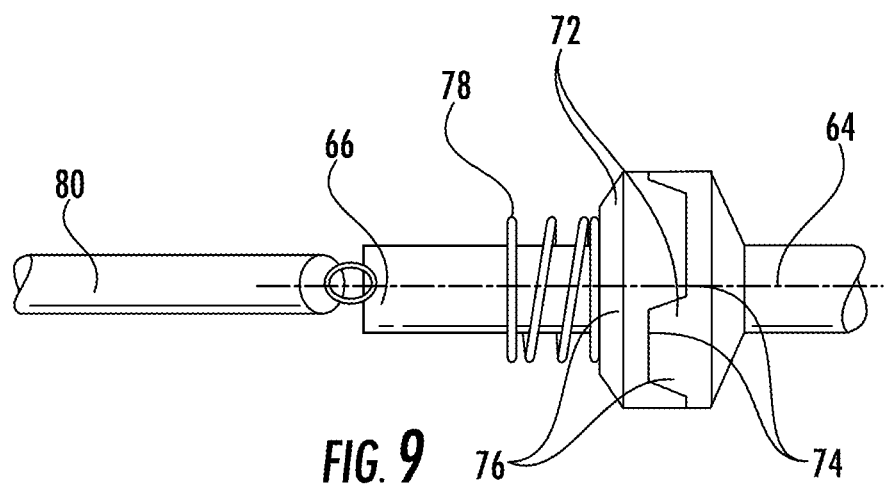
FIG. 9 is a side view of the internal components of FIG. 8, with the variable component engaged with the fixed component.

As best illustrated in FIGS. 8-9, to disengage the variable component 66 from the fixed component 64, a pulling force is applied to the variable component 66 via an actuation cable 80, which compresses the spring 78 and pulls the variable component 66 a distance away from the fixed component 64 so that the interlocking teeth 72 are no longer interlocked with one another. In the disengaged position, the seat pan 24 may then rotate relative to the fixed component 64. When the actuation cable 80 is released, the variable component 66 moves back toward the fixed component 64 so that the interlocking teeth 72 reengage at the current position of the variable component 66. In other words, when the actuation cable 80 is pulled, the variable component 66 is pulled away from the fixed component 64 and the seat pan 24 is free to rotate relative to the support structure 28. When the actuation cable 80 is released, the variable component 66 reengages with the fixed component 64 and the seat pan 24 is held in position at the respective amount of rotation attained by the seat pan 24 at the moment the actuation cable 80 is released.

In other embodiments, the tilting mechanism 58 may comprise a gas lock 82 and a linkage mechanism 84. The linkage mechanism 84 may further comprise a pair of links 86. A first end 88 of each link 86 may be pivotally coupled to one another adjacent a pivotal coupling location 90. A second end 92 of one link 86 may be coupled to the forward end 34 of the seat pan 24, and a second end 94 of the other link 86 may be coupled to the pan frame 26. The gas lock 82 may comprise a cylinder 96 and a piston 98. The cylinder 96 may be coupled to the pivotal coupling location 90, and the piston 98 may be coupled to an aft end 100 of the seat pan 24.

An automatic release mechanism 102 may be combined with the tilting mechanism 58. The automatic release mechanism 102 may be configured to return the seat pan 24 automatically to an upright position when the seat back 12 is returned to an upright position. The addition of the automatic release mechanism 102 ensures that the seat pan 24 is returned to the same upright position for take-off and landing conditions.

In some embodiments, as illustrated in FIGS. 14-17, the automatic release mechanism 102 may comprise a ramp 104 and a lever mechanism 106. The ramp 104 may be rigidly coupled to the forward end 34 of the seat pan 24, and the lever mechanism 106 may be pivotally coupled to the ramp 104. The lever mechanism 106 may comprise a first leg 108 and a second leg 110.

The ramp 104 may have a shape that is configured to be positioned proximate the forward base frame tube 42 without a forward portion of the ramp 104 contacting the forward base frame tube 42 until the seat back 12 approaches the upright position. Specifically, the ramp 104 may be configured so that the forward portion of the ramp 104 does not contact the forward base frame tube 42 until the passenger seat 10 is positioned at less than 15% of the recline range. However, one of ordinary skill in the relevant art will understand that the ramp 104 may be configured to contact the forward base frame tube 42 at any suitable amount of recline range.

Figure 17:
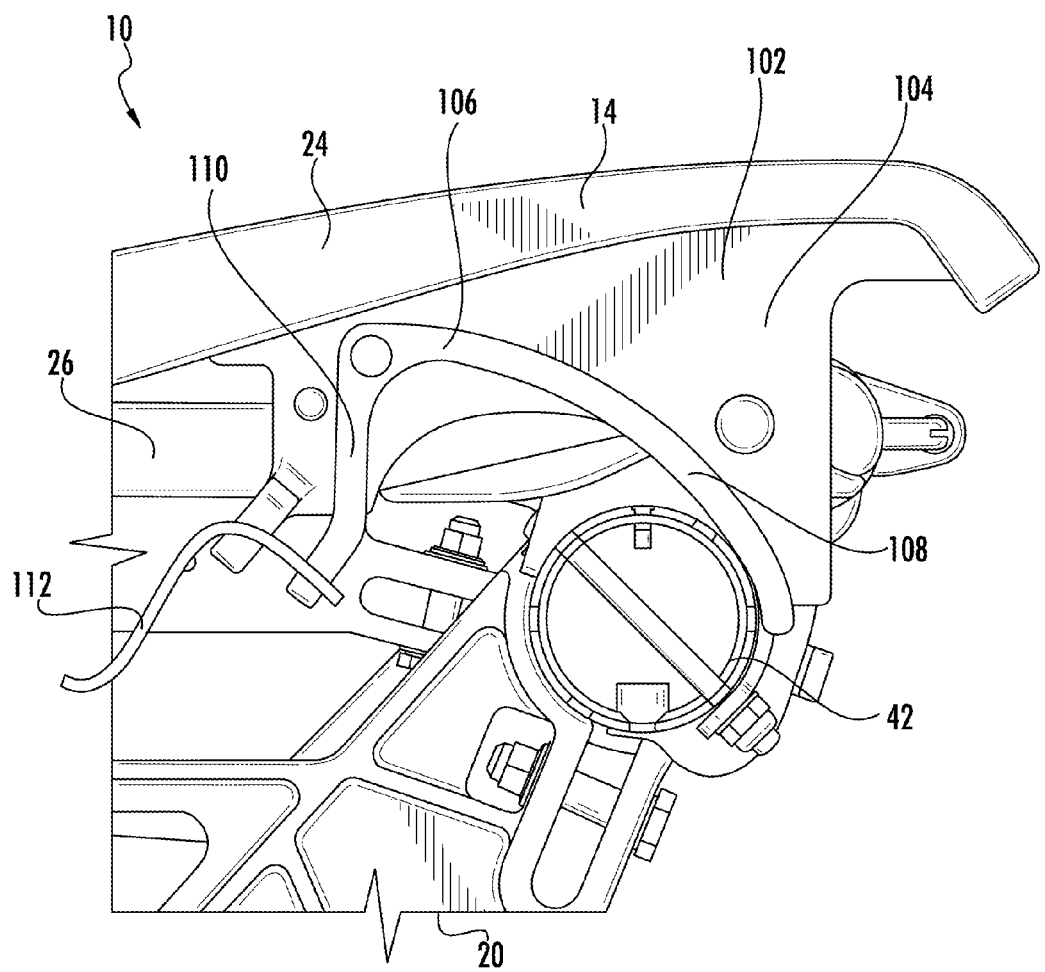
FIG. 17 is a side view of the automatic release mechanism of FIG. 14.
Figure 18:
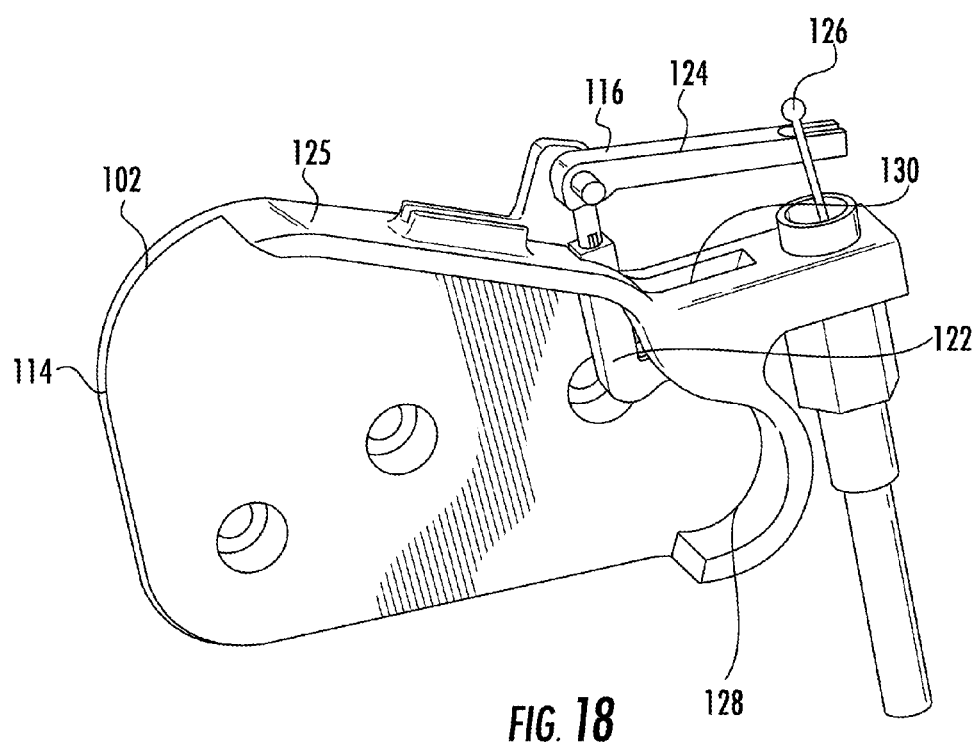
FIG. 18 is a perspective view of an automatic release mechanism according to certain embodiments of the present invention.
Figure 23:
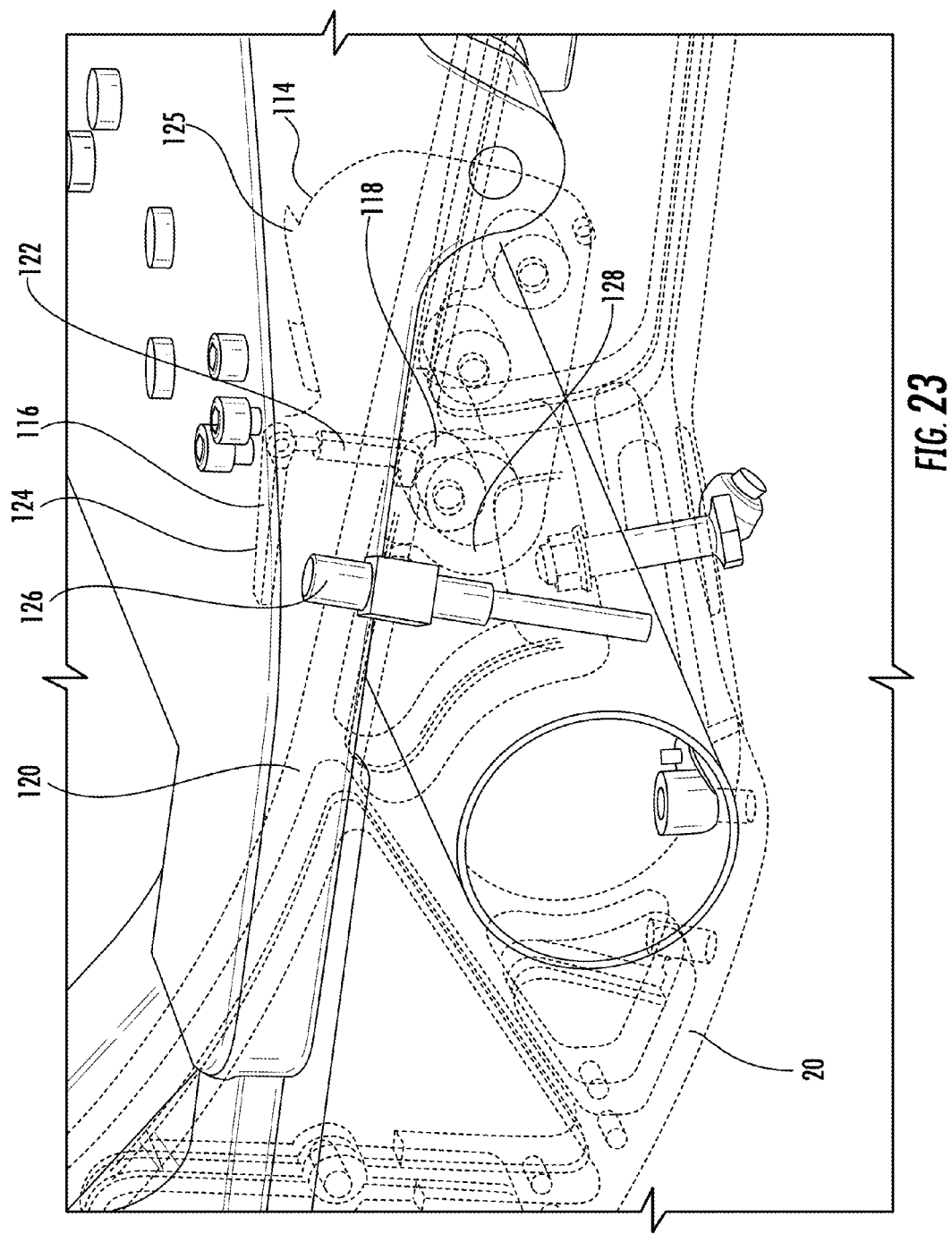
FIG. 23 is a partial perspective view of the passenger seat of FIG. 19 showing a cam follower in a recess of the automatic release mechanism when the passenger seat is in an upright position.
Figure 24:
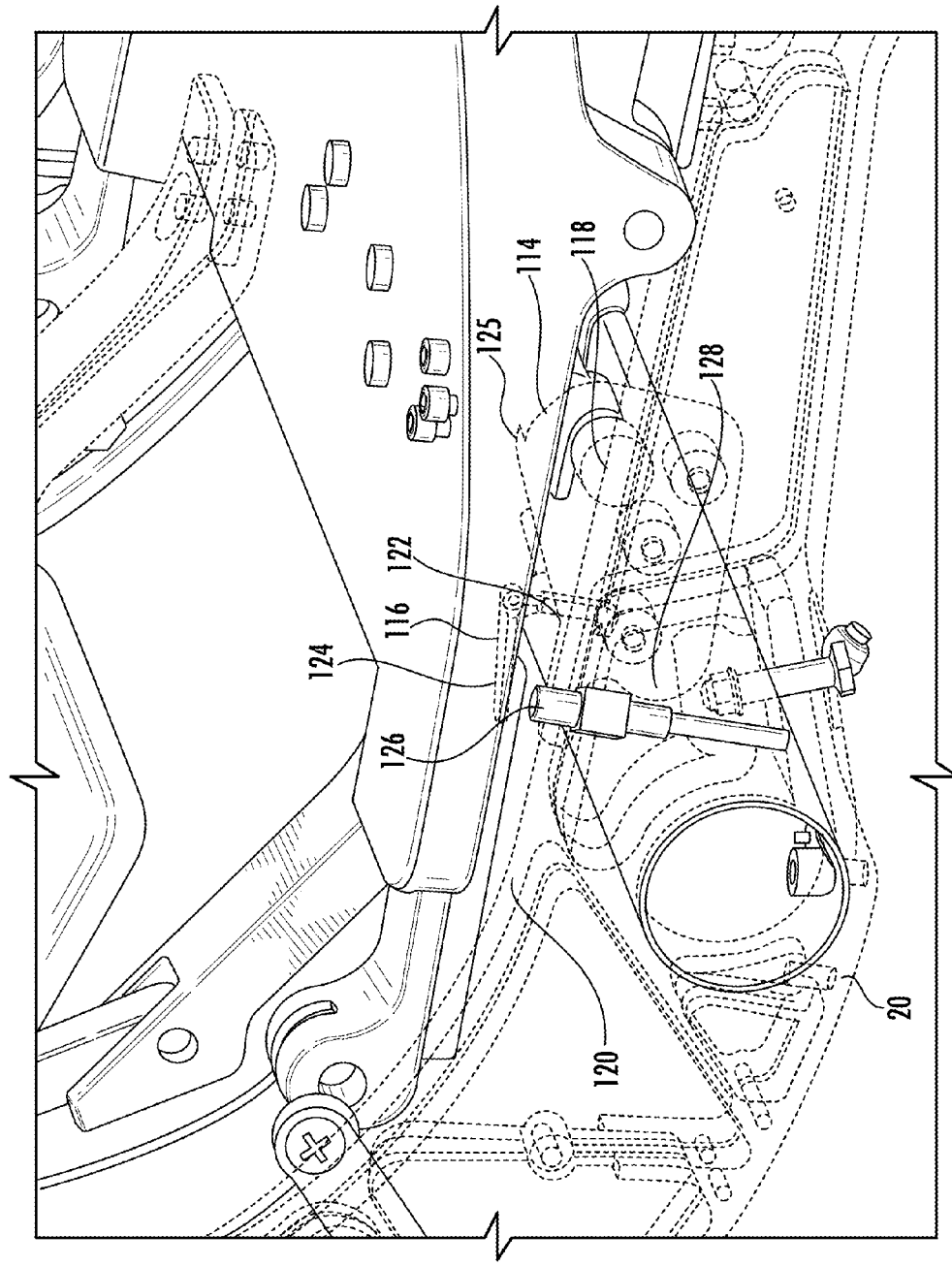
FIG. 24 is a partial perspective view of the passenger seat of FIG. 19 showing a cam follower surrounded by the automatic release mechanism when the passenger seat is in a sleeper position.
Figure 25:
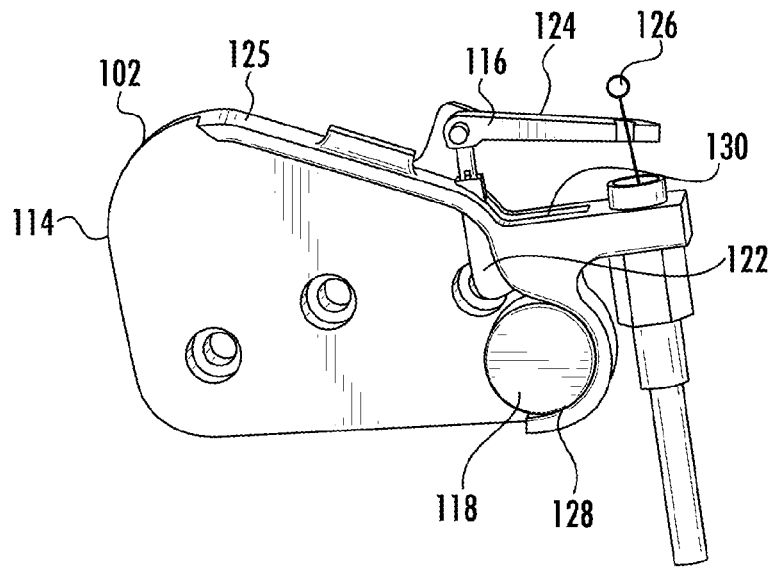
FIG. 25 is a perspective view of the automatic release mechanism of FIG. 18 showing a cam follower in a recess of the automatic release mechanism with a lever mechanism rotated into position forward of the cam follower.
Figure 26:
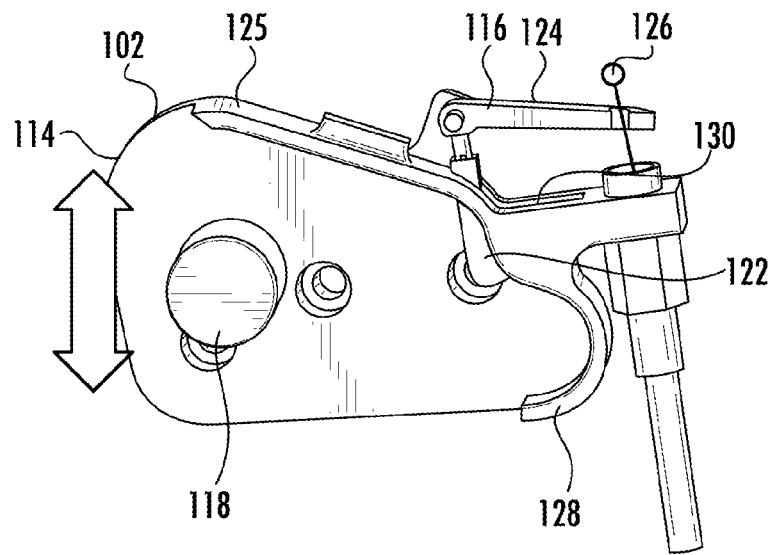
FIG. 26 is a perspective view of the automatic release mechanism of FIG. 18 showing a cam follower spaced apart from the automatic release mechanism edge with a lever mechanism rotated into position aft of the cam follower.

As best illustrated in FIG. 17, the lever mechanism 106 may be positioned so that the first leg 108 is configured to extend along at least the forward portion of the ramp 104, while also being positioned slightly aft of the forward portion of the ramp 104.

As the ramp 104 approaches the forward base frame tube 42, the first leg 108 of the lever mechanism 106 initially contacts the forward base frame tube 42 and rotates forward until the first leg 108 is substantially aligned with the forward portion of the ramp 104.

When the first leg 108 rotates forward, the second leg 110 also rotates forward. The second leg 110 may be coupled to a cable 112 that is directly connected to a mechanism that releases the tilting mechanism 58, thus allowing the seat pan 24 to move. Once the ramp 104 is in contact with the forward base frame tube 42, the shape of the ramp 104 may be configured to return the seat pan 24 to the upright position.

In other embodiments, as illustrated in FIGS. 18-32, the automatic release mechanism 102 may comprise at least one track 114, at least one lever mechanism 116 pivotally coupled to the track 114, and at least one cam follower 118. The track 114 may be rigidly coupled to an aft end 120 of the pan frame 26, the lever mechanism 116 may be pivotally coupled to the track 114, and the cam follower 118 may be attached to the aft end 100 of the seat pan 24.

The track 114 may comprise an edge 125 that is configured to be positioned proximate the cam follower 118 without contacting the cam follower 118 until the seat back 12 approaches the upright position. Specifically, the track 114 may be configured so that the edge 125 does not contact the cam follower 118 until the passenger seat 10 is positioned at less than 15% of the recline range. However, one of ordinary skill in the relevant art will understand that the track 114 may be configured so that the edge 125 contacts the cam follower 118 at any suitable amount of recline range.

The lever mechanism 116 may comprise a first leg 122 and a second leg 124 and may be positioned so that the first leg 122 is configured to extend along at least an aft portion of the edge 125, while also being positioned slightly forward of the aft portion of the edge 125.

Figure 27:
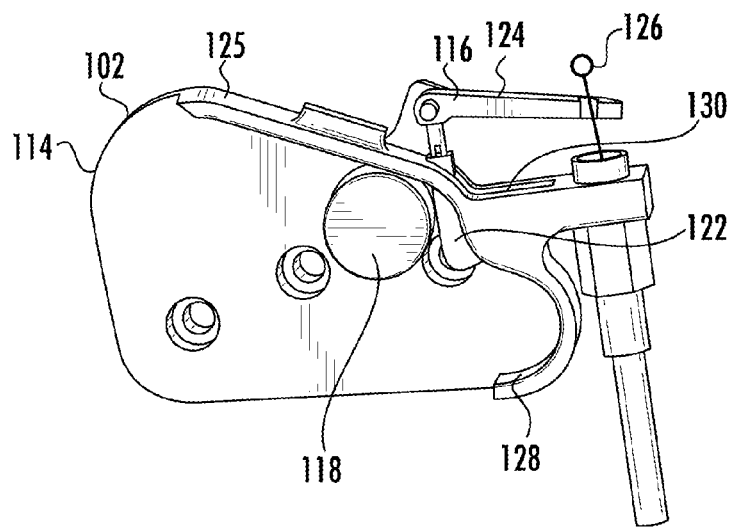
FIG. 27 is a perspective view of the automatic release mechanism of FIG. 18 showing a cam follower contacting the automatic release mechanism edge with a lever mechanism rotated into position aft of the cam follower in transition to an upright position.
Figure 28:
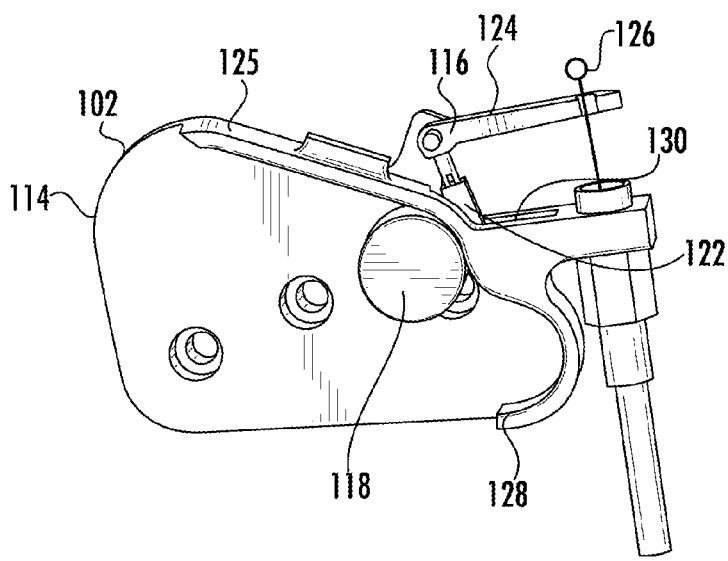
FIG. 28 is a perspective view of the automatic release mechanism of FIG. 18 showing a cam follower contacting the automatic release mechanism edge and rotating a lever mechanism into a recess of the automatic release mechanism edge in transition to an upright position.
Figure 29:
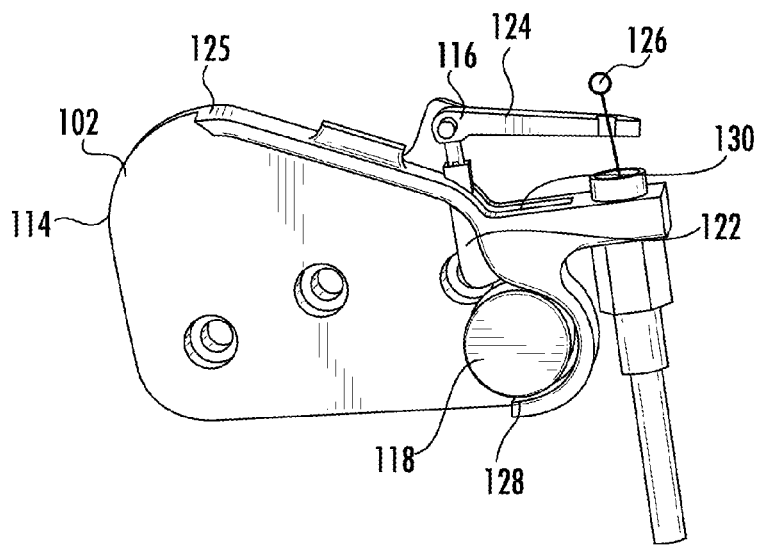
FIG. 29 is a perspective view of the automatic release mechanism of FIG. 18 showing a cam follower in a recess of the automatic release mechanism with the lever mechanism rotated into position forward of the cam follower.
Figure 30:
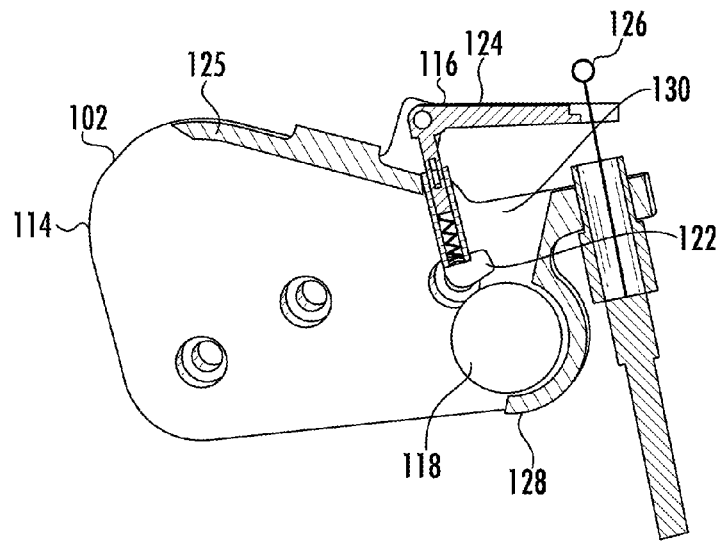
FIG. 30 is a perspective view of the automatic release mechanism of FIG. 18 showing a cam follower in a recess of the automatic release mechanism with the lever mechanism rotated into position forward of the cam follower and a spring in an uncompressed position.
Figure 31:
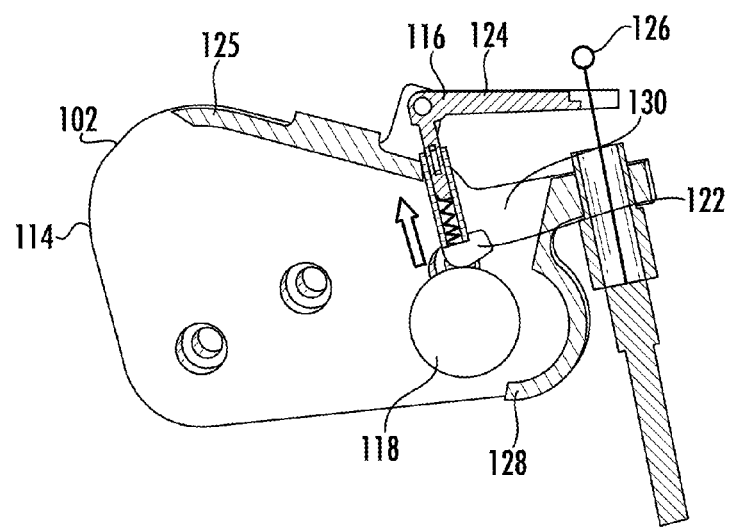
FIG. 31 is a perspective view of the automatic release mechanism of FIG. 18 showing a cam follower transitioning out of a recess of the automatic release mechanism and applying pressure to a lever mechanism so that the spring is in a compressed position.
Figure 32:
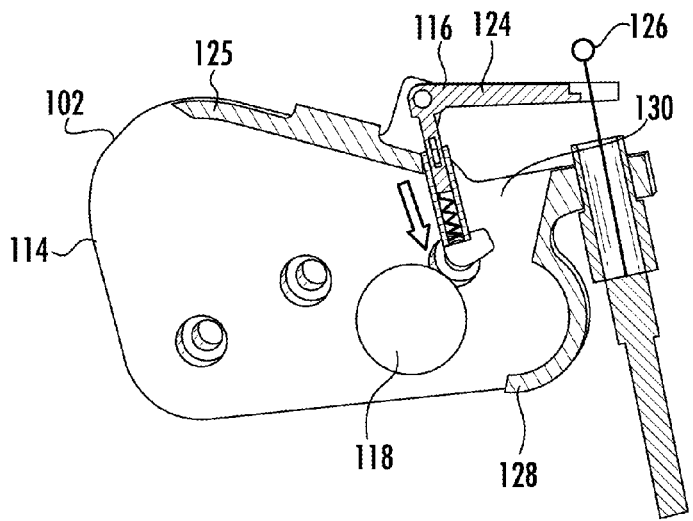
FIG. 32 is a perspective view of the automatic release mechanism of FIG. 18 showing a cam follower spaced apart from the automatic release mechanism edge with the lever mechanism rotated into position aft of the cam follower and a spring in an uncompressed position.

As illustrated in FIGS. 27-29, as the cam follower 118 approaches the edge 125, the first leg 122 initially contacts the cam follower 118 and rotates aft. The track 114 may further comprise a cavity 128 that is shaped to conform to the cam follower 118 position when the passenger seat 10 is in a fully upright position. As the cam follower 118 travels aft toward the cavity 128, the first leg 122 of the lever mechanism 116 may rotate aft into a recess 130 within the edge 125. The aft rotation of the first leg 122 also causes an aft rotation of the second leg 124, which in turn causes the second leg 124 to apply a pulling force to a cable 126 that is directly connected to a mechanism that releases the tilting mechanism 58, thus allowing the seat pan 24 to move. Once the cam follower 118 is in contact with the track 114, the shape of the edge 125 may be configured to return the seat pan 24 to the upright position.

Once the cam follower 118 reaches the cavity 128, the cam follower 118 is no longer applying pressure to the first leg 122 of the lever mechanism 116. As a result, the lever mechanism 116 returns to its original position and the second leg 124 no longer applies a pulling force to the cable 126. The first leg 122 then rotates forward from the recess 130 and extends downward and slightly forward of the cam follower 118 to hold the cam follower 118 and thus the passenger seat 10 in the upright position.

To release the passenger seat 10 from the upright position, the first leg 122 of the lever mechanism 116 may further comprise a spring 134. As the cam follower 118 begins to travel forward from the cavity 128, the cam follower 118 applies pressure to the spring 134 and compresses the spring 134 until the cam follower 118 has traveled forward beyond the first leg 122. The spring 134 then expands to its original uncompressed position.

Figure 33:
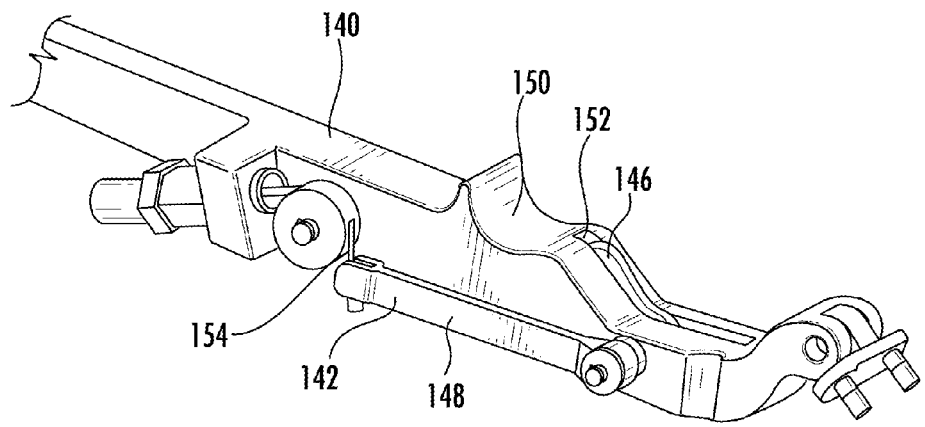
FIG. 33 is a perspective view of an automatic release mechanism according to certain embodiments of the present invention.
Figure 34:
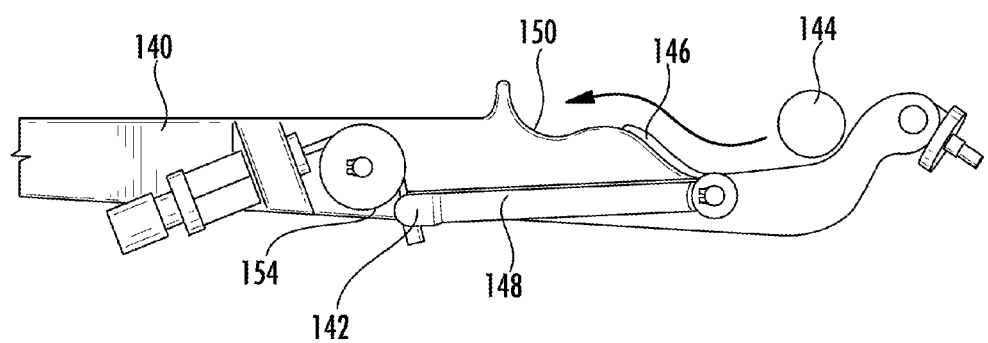
FIG. 34 is a side view of the automatic release mechanism of FIG. 33 showing a cam follower transitioning to a recess of the automatic release mechanism.

In other embodiments, as illustrated in FIGS. 33-34, the automatic release mechanism 102 may comprise at least one track 140, at least one lever mechanism 142 pivotally coupled to the track 140, and at least one cam follower 144. The track 140 may be rigidly coupled to the aft end 120 of the pan frame 26, the lever mechanism 142 may be pivotally coupled to the track 140, and the cam follower 144 may be attached to the aft end 100 of the seat pan 24.

The track 140 may be configured to be positioned proximate the cam follower 144 without contacting the cam follower 144 until the seat back 12 approaches the upright position. Specifically, the track 140 may be configured not to contact the cam follower 144 until the passenger seat 10 is positioned at less than 15% of the recline range. However, one of ordinary skill in the relevant art will understand that the track 140 may be configured so that the track 140 contacts the cam follower 144 at any suitable amount of recline range.

The lever mechanism 142 may comprise a first leg 146 and a second leg 148 and may be positioned so that the first leg 146 is configured to extend along at least an aft portion of the track 140, while also being positioned slightly forward of the aft portion of the track 140.

As illustrated in FIGS. 33-34, the track 140 may further comprise a cavity 150 that is shaped to conform to the cam follower 144 position when the passenger seat 10 is in a fully upright position. As the cam follower 144 travels aft along the track 140 approaching the cavity 150, cam follower 144 contacts the first leg 146 and rotates the first leg 146 aft into a recess 152 within the track 140. The aft rotation of the first leg 146 also causes an aft rotation of the second leg 148, which in turn causes the second leg 148 to apply a pulling force to a cable 154 that is directly connected to a mechanism that releases the tilting mechanism 58, thus allowing the seat pan 24 to move. Once the cam follower 144 is in contact with the track 140, the shape of the track 140 may be configured to return the seat pan 24 to the upright position.

Figure 3:
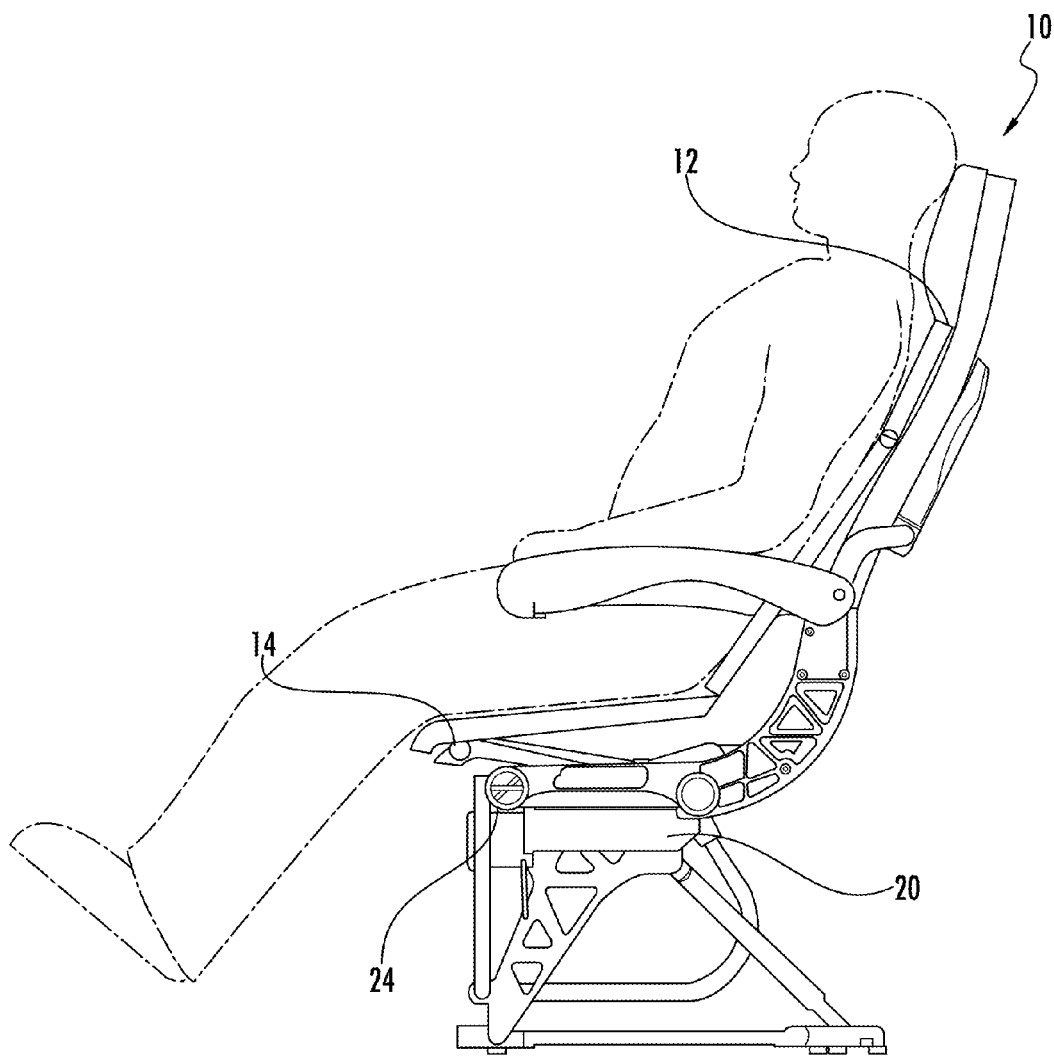
FIG. 3 is a general side view of the passenger seat of FIG. 1 in a sleeper position.
Figure 4:
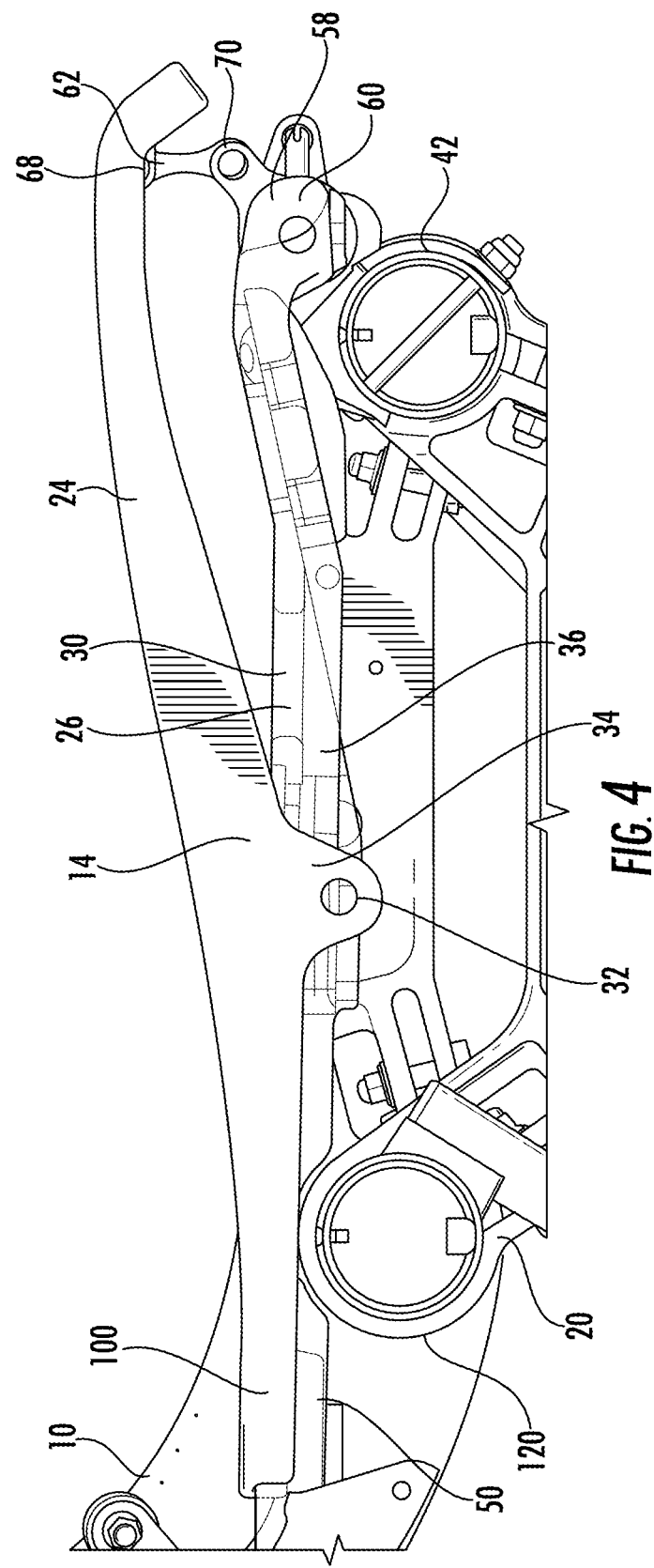
FIG. 4 is a side view of a seat pan assembly according to certain embodiments of the present invention in an upright position.
Figure 35:
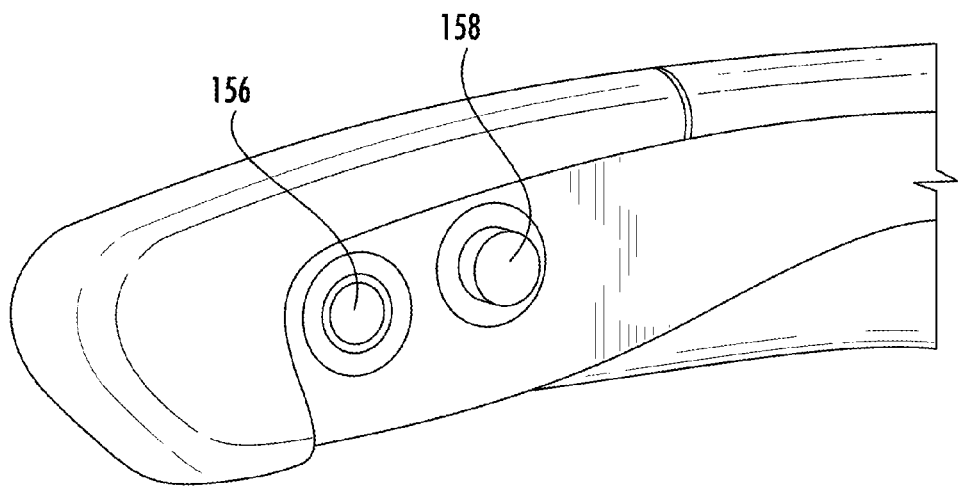
FIG. 35 is a perspective view of certain embodiments of a control panel for the passenger seat of FIG. 1.
Figure 36:
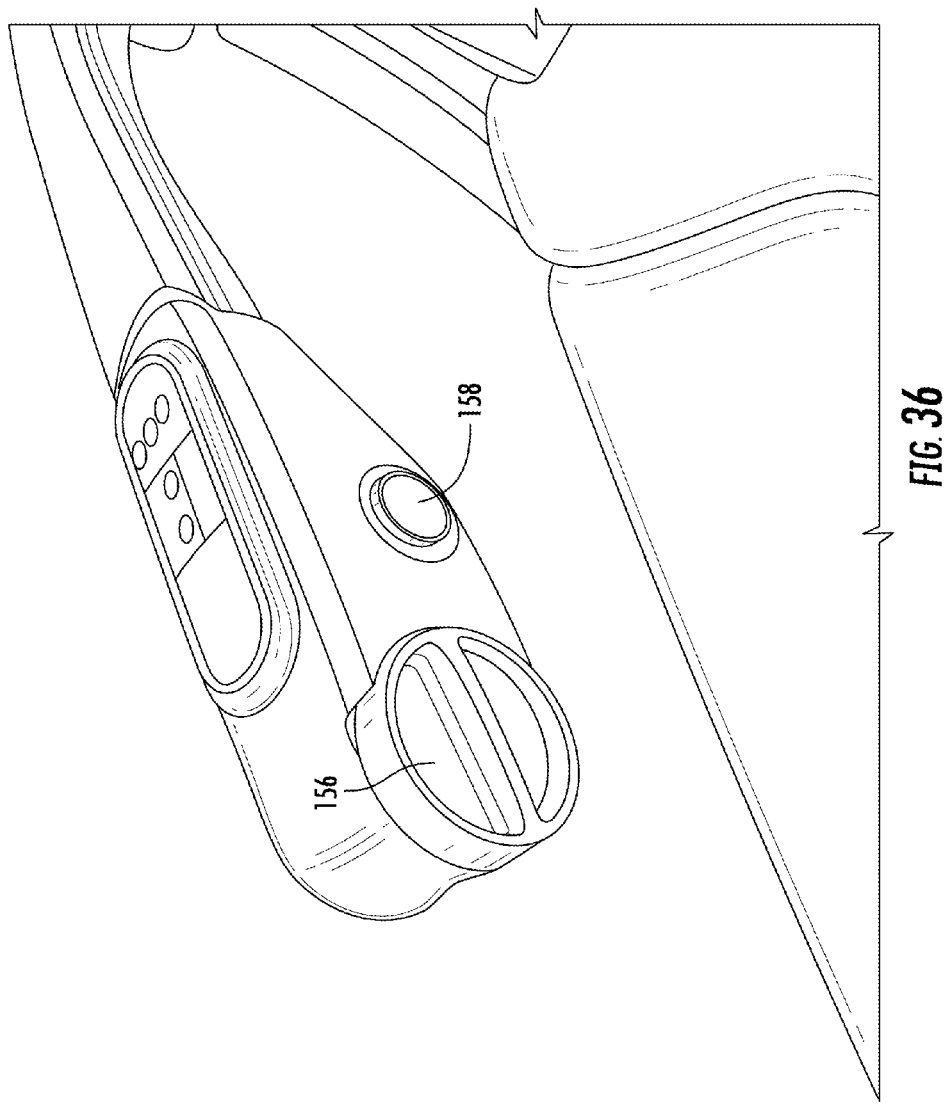
FIG. 36 is a perspective view of other embodiments of a control panel for the passenger seat of FIG. 1.
Figure 37:
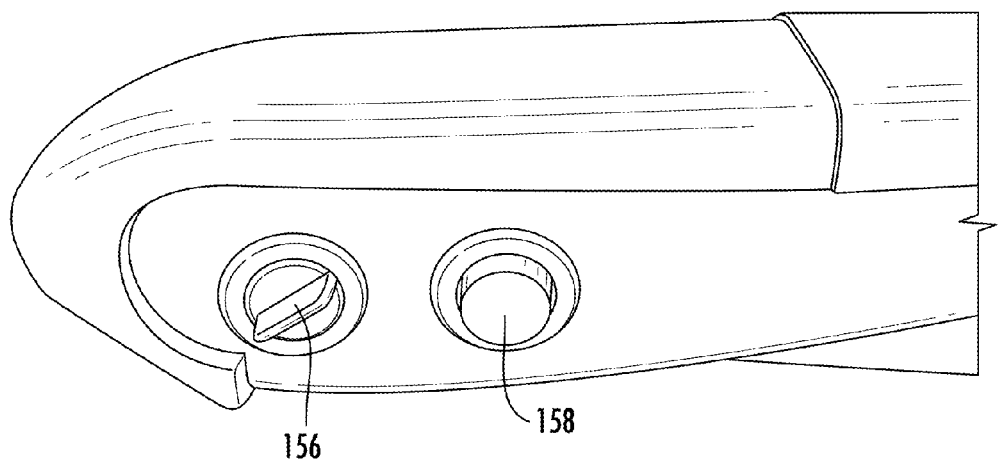
FIG. 37 is a perspective view of yet other embodiments of a control panel for the passenger seat of FIG. 1.
Figure 38:
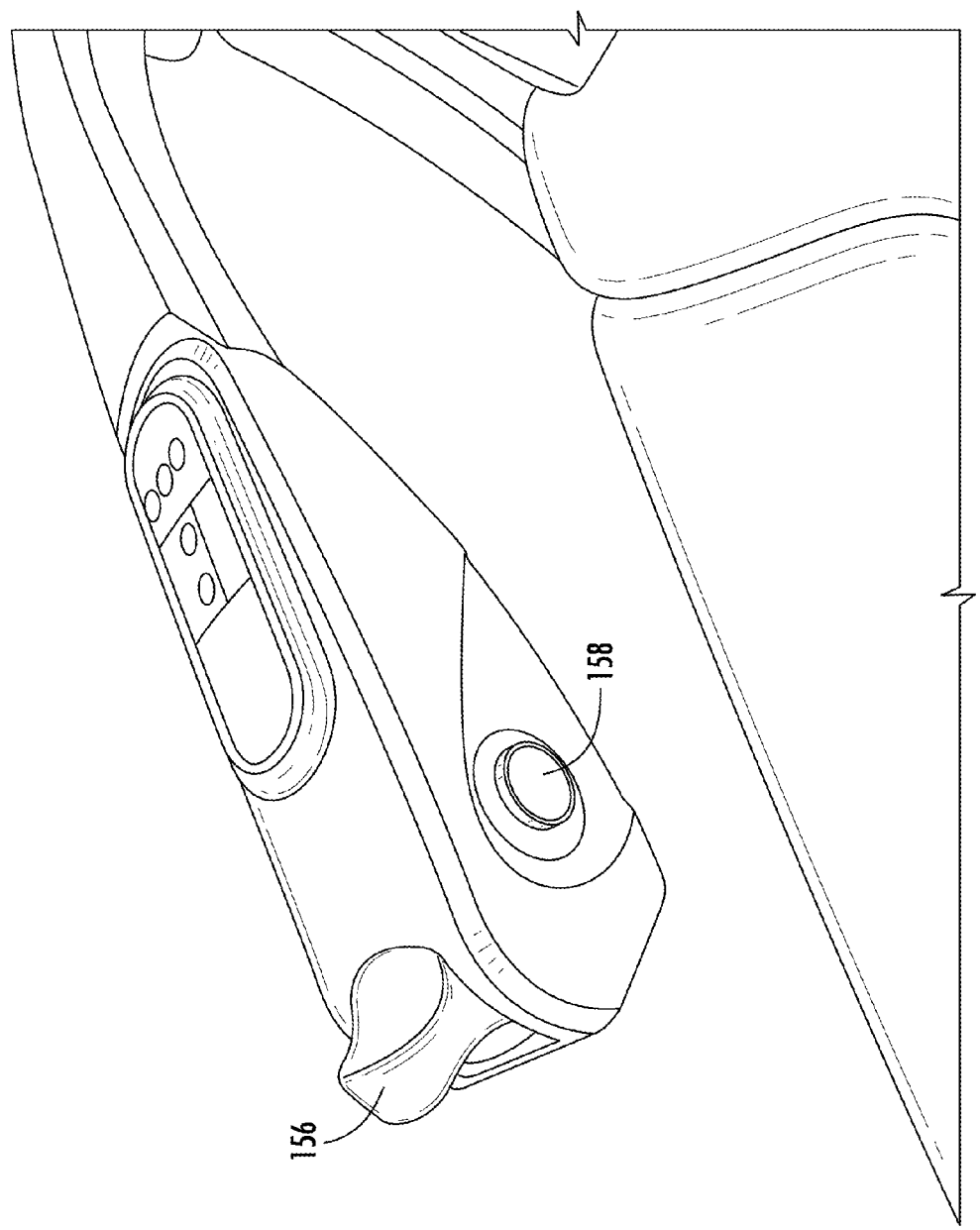
FIG. 38 is a perspective view of yet other embodiments of a control panel for the passenger seat of FIG. 1.
Figure 39:
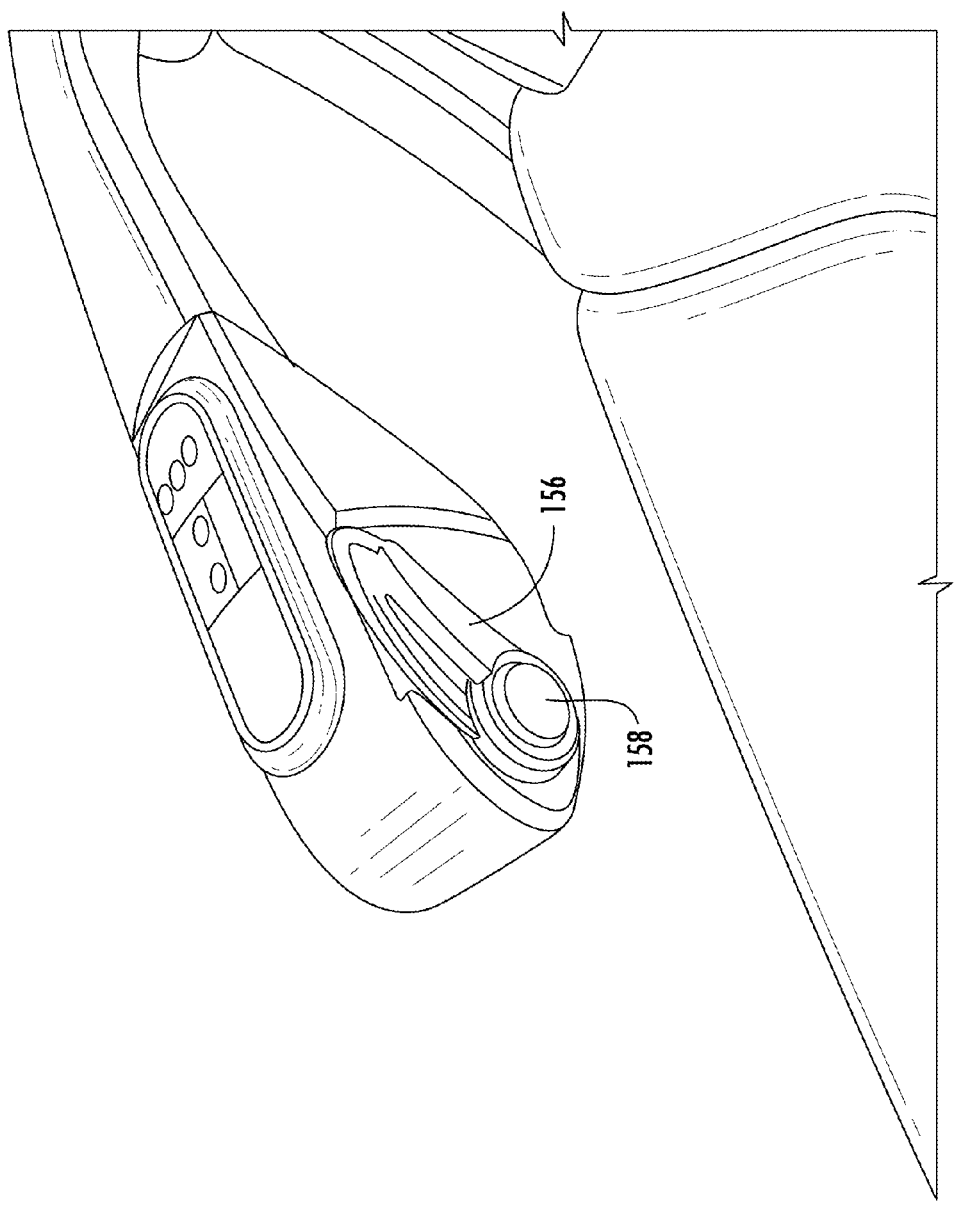
FIG. 39 is a perspective view of yet other embodiments of a control panel for the passenger seat of FIG. 1.

When a passenger desires to transition the passenger seat 10 to a sleeper position (as shown in FIG. 3), the passenger actuates a sleeper selection control 156 to transition the seat pan assembly 14 to the sleeper position and a reclining mechanism control 158 to recline the seat back 12. The sleeper selection control 156 may include a knob (as shown in FIGS. 36-37), a lever (as shown in FIG. 38), a side lever (as shown in FIG. 39), a slide (as shown in FIG. 40), a latch (as shown in FIG. 41), a button similar to a reclining mechanism control 158 (as shown in FIG. 35), or other similar control devices.

To transition the passenger seat 10 out of the sleeper position, the passenger may actuate the sleeper selection control 156 to return the seat pan assembly 14 to the upright position, while allowing the seat back 12 to remain in the reclined position.

To return the passenger seat 10 to the upright position (i.e., the position required for take-off and landing), the passenger may actuate the sleeper selection control 156 to return the seat pan 24 to the upright position and may actuate the reclining mechanism control 158 to rotate the seat back 12 to the upright position. Alternatively, for designs that incorporate the automatic release mechanism 102, the passenger may choose to only actuate the reclining mechanism control 158 to rotate the seat back 12 to the upright position, and the automatic release mechanism 102 will return the seat pan assembly 14 to the upright position.

The passenger also has the option of adjusting the amount of recline of both the seat back 12 and the seat pan assembly 14 so that the passenger seat 10 may be positioned in any configuration between the fully upright position, the sleeper position, and the reclining position.

While the above embodiments describe the use of reclining mechanisms 38 and/or tilting mechanisms 58 and/or lumbar mechanisms 18 to adjust the various positions of the passenger seat 10, any suitable device may be used to adjust the passenger seat 10 into the desired upright, reclining, and sleeper positions, including but not limited to any type of motor, spring, hydraulic controls, inflatable devices, or other similar devices, and with or without any type of lumbar mechanism 18, including but not limited to inflatable, expandable, or rotatable lumbar mechanisms.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A seat pan assembly for a passenger seat comprising:
   (a) a pan frame pivotally coupled to a seat back;
   (b) a seat pan pivotally coupled to the pan frame;
   (c) a clutch assembly coupled to the pan frame, wherein the clutch assembly comprises a fixed component and a variable component, wherein the variable component is coupled to the seat pan; and
   (d) an automatic release mechanism, wherein the automatic release mechanism is configured to return the seat pan to an upright position when the seat back is in an upright position, and wherein the automatic release mechanism further comprises a track and a lever mechanism.

2. A seat pan assembly for a passenger seat comprising:
   (a) a pan frame pivotally coupled to a seat back;
   (b) a seat pan pivotally coupled to the pan frame;
   (c) a clutch assembly coupled to the pan frame, wherein the clutch assembly comprises a fixed component and a variable component, wherein the variable component is coupled to the seat pan; and
   (d) an automatic release mechanism, wherein the automatic release mechanism is configured to return the seat pan to an upright position when the seat back is in an upright position, and wherein the automatic release mechanism further comprises a ramp and a lever mechanism.

3. The seat pan assembly of claim 2, wherein the ramp is configured to be positioned proximate a forward base frame tube without at least a forward portion of the ramp contacting the forward base frame tube until the seat back approaches the upright position.

4. The seat pan assembly of claim 1, wherein the track is configured to be positioned proximate a cam follower attached to the seat pan without at least an aft portion of the track contacting the cam follower until the seat back approaches the upright position.

5. A passenger seat comprising the seat pan assembly of claim 1 and further comprising a lumbar mechanism coupled to the seat back.

6. The seat pan assembly of claim 1, wherein the clutch assembly is configured to allow the seat pan to pivot relative to the pan frame when a pulling force is applied to the variable component.

7. The seat pan assembly of claim 1, wherein the clutch assembly is configured to lock the seat pan into position relative to the pan frame when the variable component is engaged with the fixed component.

8. A seat pan assembly for a passenger seat comprising:
(a) a pan frame pivotally coupled to a seat back;
(b) a seat pan pivotally coupled to the pan frame;
(c) a gas lock comprising a piston and a cylinder, wherein the piston is coupled to the seat pan and the cylinder is coupled to the pan frame;
(d) an automatic release mechanism, wherein the automatic release mechanism is configured to return the seat pan to an upright position when the seat back is in an upright position, and wherein the automatic release mechanism further comprises a track and a lever mechanism.

9. A seat pan assembly for a passenger seat comprising:
(a) a pan frame pivotally coupled to a seat back;
(b) a seat pan pivotally coupled to the pan frame;
(c) a gas lock comprising a piston and a cylinder, wherein the piston is coupled to the seat pan and the cylinder is coupled to the pan frame;
(d) an automatic release mechanism, wherein the automatic release mechanism is configured to return the seat pan to an upright position when the seat back is in an upright position, and wherein the automatic release mechanism further comprises a ramp and a lever mechanism.

10. The seat pan assembly of claim 9, wherein the ramp is configured to be positioned proximate a forward base frame tube without at least a forward portion of the ramp contacting the forward base frame tube until the seat back approaches the upright position.

11. The seat pan assembly of claim 8, wherein the track is configured to be positioned proximate a cam follower attached to the seat pan without at least an aft portion of the track contacting the cam follower until the seat back approaches the upright position.

12. A passenger seat comprising the seat pan assembly of claim 8 and further comprising a lumbar mechanism coupled to the seat back.

13. A seat pan assembly for a passenger seat comprising:
(a) a pan frame pivotally coupled to a seat back;
(b) a seat pan pivotally coupled to the pan frame;
(c) a tilting mechanism coupled to the seat pan and the pan frame, wherein the tilting mechanism is configured to rotate the seat pan between an upright position and a sleeper position; and
(d) an automatic release mechanism, wherein the automatic release mechanism is configured to return the seat pan to the upright position when the seat back is in an upright position, and wherein the automatic release mechanism further comprises a track and a lever mechanism.

14. A seat pan assembly for a passenger seat comprising:
(a) a pan frame pivotally coupled to a seat back;
(b) a seat pan pivotally coupled to the pan frame;
(c) a tilting mechanism coupled to the seat pan and the pan frame, wherein the tilting mechanism is configured to rotate the seat pan between an upright position and a sleeper position; and
(d) an automatic release mechanism, wherein the automatic release mechanism is configured to return the seat pan to the upright position when the seat back is in an upright position, and wherein the automatic release mechanism further comprises a ramp and a lever mechanism.

15. The seat pan assembly of claim 14, wherein the ramp is configured to be positioned proximate a forward base frame tube without at least a forward portion of the ramp contacting the forward base frame tube until the seat back approaches the upright position.

16. The seat pan assembly of claim 13, wherein the track is configured to be positioned proximate a cam follower attached to the seat pan without at least an aft portion of the track contacting the cam follower until the seat back approaches the upright position.

17. A passenger seat comprising the seat pan assembly of claim 13 and further comprising a lumbar mechanism coupled to the seat back.

* * * * *